(12) United States Patent
Degraye et al.

(10) Patent No.: US 11,778,360 B2
(45) Date of Patent: *Oct. 3, 2023

(54) METHOD AND SYSTEM FOR AUDIO SHARING

(71) Applicant: HED Technologies Sari, Geneva (CH)

(72) Inventors: Timothy Degraye, Geneva (CH); Liliane Huguet, Geneva (CH)

(73) Assignee: HED Technologies SARL, Geneva (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/062,220

(22) Filed: Oct. 2, 2020

(65) Prior Publication Data

US 2021/0021923 A1 Jan. 21, 2021

Related U.S. Application Data

(63) Continuation of application No. 16/842,065, filed on Apr. 7, 2020, now Pat. No. 10,932,028, which is a
(Continued)

(51) Int. Cl.
*H04R 1/10* (2006.01)
*H04R 3/12* (2006.01)
(Continued)

(52) U.S. Cl.
CPC ......... *H04R 1/1041* (2013.01); *G06F 3/0488* (2013.01); *G10K 11/178* (2013.01);
(Continued)

(58) Field of Classification Search
CPC .. H04R 3/005; H04R 1/1083; H04R 2410/05; H04R 29/005; G10K 11/17857;
(Continued)

(56) References Cited

U.S. PATENT DOCUMENTS 5,257,420 A 11/1993 Byrne, Jr.
6,888,950 B2 5/2005 Siskin et al.
(Continued)

FOREIGN PATENT DOCUMENTS

CN 2528177 12/2002
CN 101142797 3/2008
(Continued)

OTHER PUBLICATIONS

European Patent Application No. 15873755.1, Partial Search Report dated Aug. 8, 2018.
(Continued)

*Primary Examiner* — Alexander Krzystan
(74) *Attorney, Agent, or Firm* — Foundation Law Group LLP; JD Harriman

(57) ABSTRACT

The present invention provide a method and system of audio sharing aimed to revolutionize the way people listen and share music and to give multiple uses to a wireless headphone referred to as HEDphone. A communication protocol referred to as HEDtech protocol is used in a HED system to allow users to share music amongst a plurality of HEDphones while using a single audio source. A wireless connection is established between the HEDphone and a mobile device including an audio source while simultaneously having the capability of allowing other HEDphone users to join wirelessly and listen to the same audio source. A feature of Super Human Hearing (SHH) goes beyond conventional ANR (ambient noise reduction) with additional features that allow the user to control their aural environment by being able to directionally increase or decrease selective frequencies.

20 Claims, 21 Drawing Sheets

Related U.S. Application Data continuation of application No. 16/779,157, filed on Jan. 31, 2020, now Pat. No. 10,904,655, which is a continuation of application No. 16/729,232, filed on Dec. 27, 2019, now Pat. No. 10,750,270, which is a continuation of application No. 16/719,719, filed on Dec. 18, 2019, now Pat. No. 11,095,971, which is a continuation of application No. 16/413,384, filed on May 15, 2019, now Pat. No. 10,687,137, which is a continuation of application No. 14/757,655, filed on Dec. 23, 2015, now Pat. No. 10,390,122.

(60) Provisional application No. 62/096,209, filed on Dec. 23, 2014.

(51) Int. Cl.
    G10K 11/178    (2006.01)
    G06F 3/0488    (2022.01)
    H04R 1/32      (2006.01)
    H04R 19/04     (2006.01)
    H04R 29/00     (2006.01)
    H04R 1/40      (2006.01)
    H04R 3/00      (2006.01)
    H04R 3/02      (2006.01)
    H04R 5/033     (2006.01)

(52) U.S. Cl.
    CPC .. *G10K 11/17821* (2018.01); *G10K 11/17837* (2018.01); *G10K 11/17854* (2018.01); *G10K 11/17857* (2018.01); *G10K 11/17873* (2018.01); *G10K 11/17885* (2018.01); *H04R 1/1083* (2013.01); *H04R 1/326* (2013.01); *H04R 3/12* (2013.01); *H04R 19/04* (2013.01); *H04R 29/00* (2013.01); *G10K 2210/1081* (2013.01); *G10K 2210/3014* (2013.01); *G10K 2210/3025* (2013.01); *H04R 1/1008* (2013.01); *H04R 1/406* (2013.01); *H04R 3/005* (2013.01); *H04R 3/02* (2013.01); *H04R 5/033* (2013.01); *H04R 2410/01* (2013.01); *H04R 2410/05* (2013.01); *H04R 2420/07* (2013.01)

(58) Field of Classification Search
    CPC ....... G10K 11/17823; G10K 11/17881; G10K 2210/108
    USPC ............. 381/71.8, 71.14, 71.7, 92, 72
    See application file for complete search history.

(56) References Cited

U.S. PATENT DOCUMENTS

| | | | |
|---|---|---|---|
| 7,970,159 B2 | 6/2011 | Kleinschmidt et al. | |
| RE43,872 E | 12/2012 | Trip et al. | |
| 8,340,058 B2 | 12/2012 | Vedurmudi | |
| 8,811,629 B1* | 8/2014 | Kulavik | H03G 3/3089 381/104 |
| 2004/0156012 A1 | 8/2004 | Jannard et al. | |
| 2006/0205349 A1 | 9/2006 | Passier | |
| 2007/0042762 A1 | 2/2007 | Guccione | |
| 2007/0160249 A1 | 7/2007 | LeGette et al. | |
| 2007/0287380 A1* | 12/2007 | Hui | H04R 5/033 455/41.1 |
| 2008/0090524 A1 | 4/2008 | Lee et al. | |
| 2008/0096531 A1 | 4/2008 | McQuaide et al. | |
| 2008/0157991 A1 | 7/2008 | Raghunrath et al. | |
| 2008/0175403 A1 | 7/2008 | Tan | |
| 2008/0177972 A1 | 7/2008 | Tan | |
| 2008/0181419 A1 | 7/2008 | Goldstein et al. | |
| 2008/0201138 A1 | 8/2008 | Visser et al. | |
| 2008/0212791 A1 | 9/2008 | Asada et al. | |
| 2009/0097672 A1 | 4/2009 | Bull et al. | |
| 2009/0109940 A1 | 4/2009 | Vedurmudi | |
| 2009/0186668 A1 | 7/2009 | Rahman et al. | |
| 2009/0208923 A1 | 8/2009 | Gelfand | |
| 2009/0209304 A1 | 8/2009 | Ngia et al. | |
| 2009/0257615 A1 | 10/2009 | Bayer, Jr. | |
| 2010/0040240 A1 | 2/2010 | Bonanno | |
| 2010/0048134 A1 | 2/2010 | McCarthy | |
| 2010/0166243 A1 | 7/2010 | Siskin | |
| 2010/0279608 A1 | 11/2010 | Shi-En | |
| 2010/0296668 A1 | 11/2010 | Lee et al. | |
| 2010/0299639 A1 | 11/2010 | Ramsay | |
| 2010/0308999 A1 | 12/2010 | Chornenky | |
| 2011/0038489 A1* | 2/2011 | Visser | G10L 21/0216 381/92 |
| 2011/0161476 A1* | 6/2011 | Wolff-Peterson | A63F 13/25 709/222 |
| 2011/0288860 A1 | 11/2011 | Schevciw | |
| 2012/0082335 A1 | 4/2012 | Duisters et al. | |
| 2012/0120270 A1 | 5/2012 | Li et al. | |
| 2012/0128175 A1* | 5/2012 | Visser | H04R 3/005 381/92 |
| 2012/0237053 A1 | 9/2012 | Alam et al. | |
| 2013/0038458 A1 | 2/2013 | Toivola et al. | |
| 2013/0108071 A1 | 5/2013 | Huang et al. | |
| 2013/0124204 A1 | 5/2013 | Wong et al. | |
| 2013/0148818 A1 | 6/2013 | Yamkovoy | |
| 2013/0208923 A1 | 8/2013 | Suvanto | |
| 2013/0214998 A1* | 8/2013 | Andes | G06F 3/0346 345/8 |
| 2013/0279705 A1 | 10/2013 | Wong et al. | |
| 2013/0279715 A1 | 10/2013 | Tan | |
| 2013/0316642 A1 | 11/2013 | Newham | |
| 2013/0322424 A1 | 12/2013 | Fraser | |
| 2013/0339859 A1 | 12/2013 | Hardi | |
| 2014/0126735 A1 | 5/2014 | Gauger, Jr. | |
| 2014/0133669 A1 | 5/2014 | Klinghult | |
| 2014/0143343 A1 | 5/2014 | Edholm | |
| 2014/0185828 A1 | 7/2014 | Helbling | |
| 2014/0198778 A1 | 7/2014 | Fraser | |
| 2014/0269425 A1 | 9/2014 | Fisher et al. | |
| 2014/0270228 A1 | 9/2014 | Oishi | |
| 2014/0273851 A1* | 9/2014 | Donaldson | H04M 1/6066 455/41.2 |
| 2015/0117659 A1 | 4/2015 | Kirsch | |
| 2015/0249898 A1 | 9/2015 | Horbach | |
| 2015/0287422 A1 | 10/2015 | Short et al. | |
| 2015/0294662 A1 | 10/2015 | Ibrahim | |
| 2016/0125869 A1 | 5/2016 | Kulavik | |
| 2016/0150575 A1 | 5/2016 | Andersen et al. | |
| 2016/0165336 A1 | 6/2016 | Di Censo et al. | |
| 2017/0127206 A1* | 5/2017 | Skovenborg | H04R 29/007 |
| 2017/0142511 A1 | 5/2017 | Dennis | |
| 2020/0314646 A1* | 10/2020 | Dean-Bhtyan | H04R 1/1041 |

FOREIGN PATENT DOCUMENTS

| | | |
|---|---|---|
| CN | 101640552 | 2/2010 |
| CN | 102893331 | 1/2013 |
| CN | 103414982 | 11/2013 |
| CN | 103686516 | 3/2014 |
| CN | 104053253 | 9/2014 |
| JP | 2003-023479 | 1/2003 |
| JP | 2009-135960 | 6/2009 |
| JP | 2012-039624 | 2/2012 |
| JP | 2012-524917 | 10/2012 |
| KR | 10-0782083 | 12/2007 |
| KR | 10-2009-0103953 | 10/2009 |
| TW | 200937196 | 9/2009 |
| WO | 2008130328 | 10/2008 |
| WO | 2015134333 | 9/2015 |
| WO | 2016209295 | 12/2016 |

OTHER PUBLICATIONS

European Patent Application No. 15873755.1, Search Report dated Jan. 2, 2019.

(56) References Cited

OTHER PUBLICATIONS

International Application No. PCT/US2015/000164, International Search Report dated Apr. 22, 2016.
International Application No. PCT/US2015/000164, Written Opinion dated Apr. 22, 2016.
Japanese Patent Application No. 2017-552787, Search Report dated Feb. 3, 2020, with English translation, 11 pages.
Canadian Patent Application No. 2,971,147, Search Report dated Apr. 6, 2020, 3 pages.
Sahidullah et al., "Comparison of Speech Activity Detection Techniques for Speaker Recognition", Oct. 1, 2012 (retrieved from https://arxiv.org/pdf/1210.0297.pdf, May 21, 2019) (7 pages).

* cited by examiner

METHOD AND SYSTEM FOR AUDIO SHARING

CROSS-REFERENCE TO RELATED APPLICATION

The present application is a continuation of U.S. patent application Ser. No. 16/842,065 filed Apr. 7, 2020 and entitled "Method and System for Audio Sharing," which is a continuation of U.S. patent application Ser. No. 16/779,157 filed Jan. 31, 2020 and entitled "Method and System for Audio Sharing," which is a continuation of U.S. patent application Ser. No. 16/729,232 filed Dec. 27, 2019 and entitled "Method and System for Audio Sharing," now U.S. Pat. No. 10,750,270, which is a continuation of U.S. patent application Ser. No. 16/719,719 filed Dec. 18, 2019 and entitled "Method and System for Audio Sharing," which is a continuation of U.S. patent application Ser. No. 16/413,384 filed May 15, 2019 and entitled "Method and System for Audio Sharing," now U.S. Pat. No. 10,687,137, which is a continuation of U.S. patent application Ser. No. 14/757,655 filed Dec. 23, 2015 and entitled "Method and System for Audio Sharing," now U.S. Pat. No. 10,390,122, which claims priority to U.S. Provisional Patent Application Ser. No. 62/096,209 filed Dec. 23, 2014 and entitled "Method and System for Audio Sharing," which are hereby incorporated by reference herein.

BACKGROUND OF THE INVENTION

Field of the Invention

The present invention relates to a system including a headset which is used in connection with a multimedia device and in particular to a system and method for music sharing and communication amongst wireless headphones and an improved wireless headphone providing control of the aural environment to provide super human hearing.

Description of the Related Art

Bluetooth enabled headphones are known for wireless communication to an audio source. U.S. Pat. No. RE43,872 describes that headsets or headphones are commonly used in connection with communication and/or multimedia devices in order to listen to audio signals produced by or transferred from these devices. Examples of such communication and/or multimedia devices are radio receivers, portable music players like CD players and MP3 players as well as mobile phones. The most recent generation of these headsets is represented by so-called on-ear Bluetooth voice headsets which have become more and more popular in the past. The reason is that these on-ear headsets provide a very convenient way in order to wear the headset for a hands-free communication. The head set can be used in connection with a communication and/or multimedia device and which allows to listen to audio signals either in a mono mode, which is sufficient for telephone communication, or in a stereo mode, which is desired for listening to music.

U.S. Pat. No. 8,340,058 describes a headphone having ability to communicate using Internet Protocol (IP) standard. In an embodiment, the headphone is provided a wireless LAN (WLAN) network interface such that VOIP calls are conducted using a wireless medium. Similarly, a Bluetooth protocol type interface is also provided to communicate with a cellular phone and the communication forms the basis for the voice calls between the headphone and other cellular phones connected via the cellular network.

It is desirable to provide a method and system to use wireless headphones for audio sharing between headphones.

SUMMARY OF THE INVENTION

The present invention provide a method and system of audio sharing aimed to revolutionize the way people listen and share music and to give multiple uses to a wireless headphone referred to as HEDphone. A communication protocol referred to as HEDtech protocol is used in a HED system to allow users to share music amongst a plurality of HEDphones while using a single audio source. A wireless connection is established between the HEDphone and a mobile device including an audio source while simultaneously having the capability of allowing other HEDphone users to join wirelessly and listen to the same audio source. The HED system creates what is referred to as HEDmesh using the HEDtech protocol.

In one embodiment, the HEDphone is a Hi-Fi stereo wireless headphone with the added capability of creating a wireless mesh (HEDmesh) in order to share audio with other HEDphone users within range. The HEDphone is wirelessly connected to a mobile device, such as a mobile phone or tablet via Bluetooth or cable, and is then able to broadcast the audio via the HEDtech protocol to others users within range.

In one embodiment, the HEDphone provides a feature referred to as Super Human Hearing (SHH). Super Human Hearing (SHH) goes beyond conventional ANR (ambient noise reduction) with additional features that allow the user to control their aural environment by being able to directionally increase or decrease selective frequencies.

In one embodiment, a detection device is used in combination with the HEDphone to detect whether the HEDphone is positioned on the head. The audio source to the HEDphone can be stopped when the HEDphone is detected as having been removed from the head.

The invention will be more fully described by reference to the following drawings.

DETAILED DESCRIPTION

Figure 1:
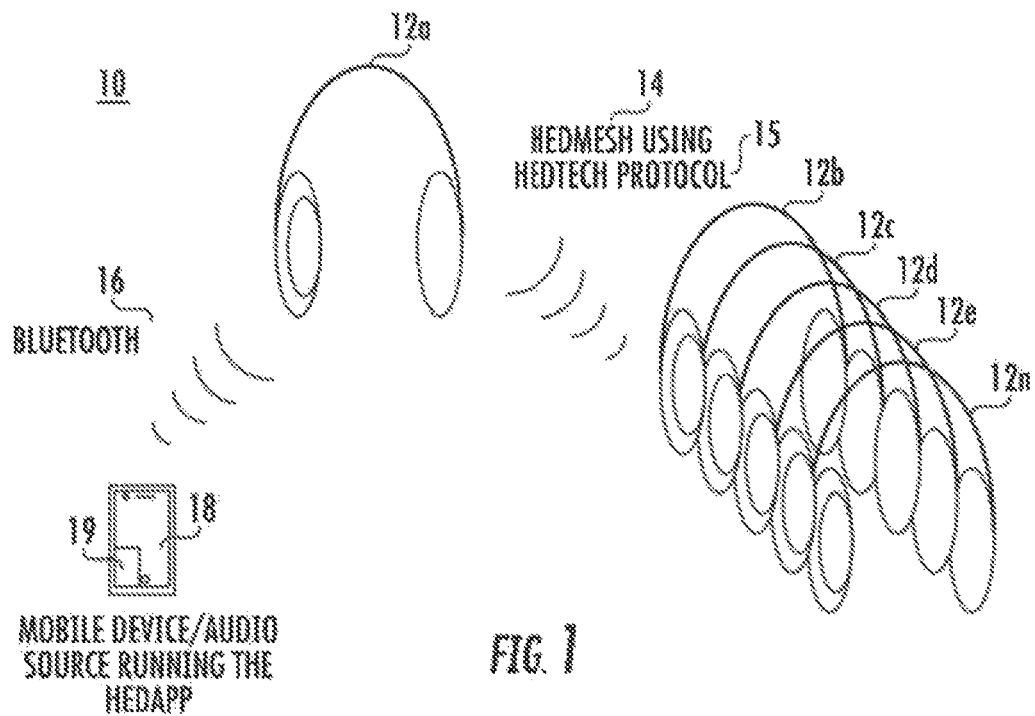
FIG. 1 is a schematic diagram of a system for audio sharing in accordance with the teachings of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a schematic diagram of a system for audio sharing 10, referred to as HEDsystem. HEDmesh 14 using HEDtech protocol 15 is used in HED system 10 to allow users to share music via HEDphones 12a-12n while using a single audio source. A wireless connection 16 is established between HEDphone 12a and audio source 18. Audio source 18 can be a mobile device running a HED application 19. Wireless connection 16 can be for example a Bluetooth, SBC or AAC connection. HEDmesh 14 using HEDtech protocol 15 allows HEDphones 12b-12n to simultaneously join wirelessly and listen to audio source 18 HEDtech protocol 15 can use Wi-Fi transmission as a transport layer for HEDtech protocol 15 to create HEDmesh 14. HEDtech protocol 15 can support for example the following Bluetooth profiles: Advanced Audio Distribution Profil (A2DP); Audio/Video Remote Control Profile (AVRCP); Cordless Telephony Profile (CTP); File Transfer Profile (FTP)(to transfer music files); Generic Audio/Video Distribution Profile (GAVDP); Generic Access Profile (GAP); Hands-Free Profile (HSP); Intercom Profile (ICP); LAN Access Profile (LAP); Message Access Profile (MAP); Personal Area Networking Profile (PAN); Phone Book Access Profile (PBAP, PBA); Video Distribution Profile (VDP); and Wireless Application Protocol Bearer (WAPB).

Figure 2:
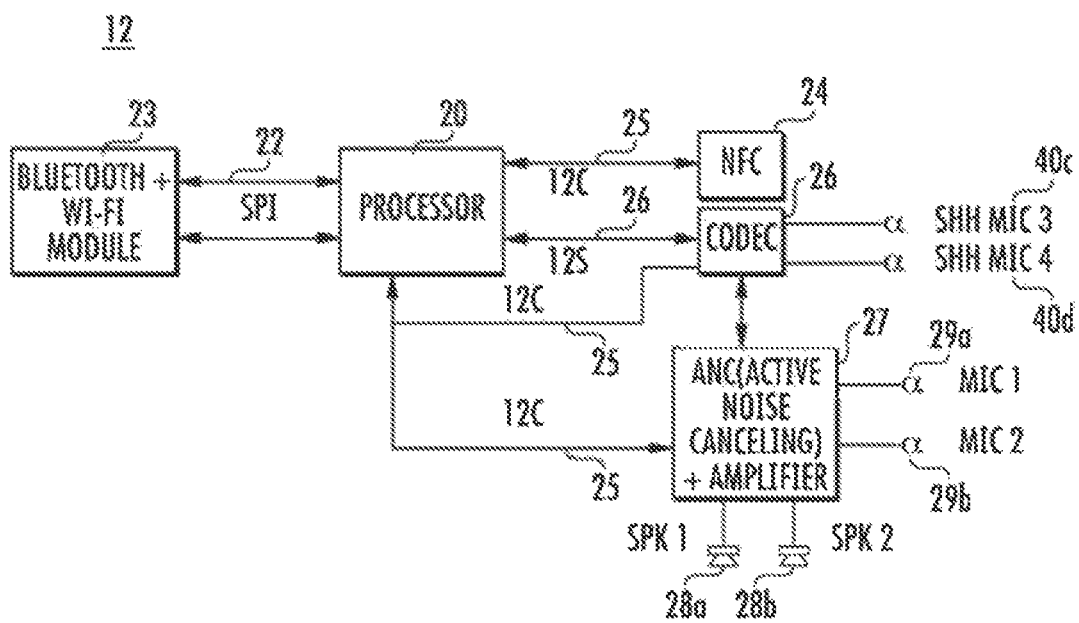
FIG. 2 is a schematic diagram of a HEDphone.

FIG. 2 is a schematic diagram of HEDphone 12. HEDphone 12 is a headphone with functionality. HEDphone 12 is controlled and configurable via HEDapp 19 downloadable to audio source 18. HEDapp 19 is a user interface that will allow the control of settings such as, noise reduction, microphone On/Off, EQ levels and control access to HEDmesh 14. Processor 20 communicates with serial peripheral interface (SPI) 22 to Bluetooth and Wi-Fi Module 23. Processor 20 communicates with 12C bus protocol 25 to NFC 24 or 12 S bus protocol 21 to CODEC 26 and Active Noise Cancelling (ANC) amplifier 27. Microphones 29a and 29b and speakers 28a and 28b are coupled to Active Noise Cancelling (ANC) amplifier 27. Microphones 29a and 29b can be used to support conventional phone functionalities as well as communicate with members of HEDmesh 14 (shown in FIG. 1) using VoIP or other methods.

Figure 3A:
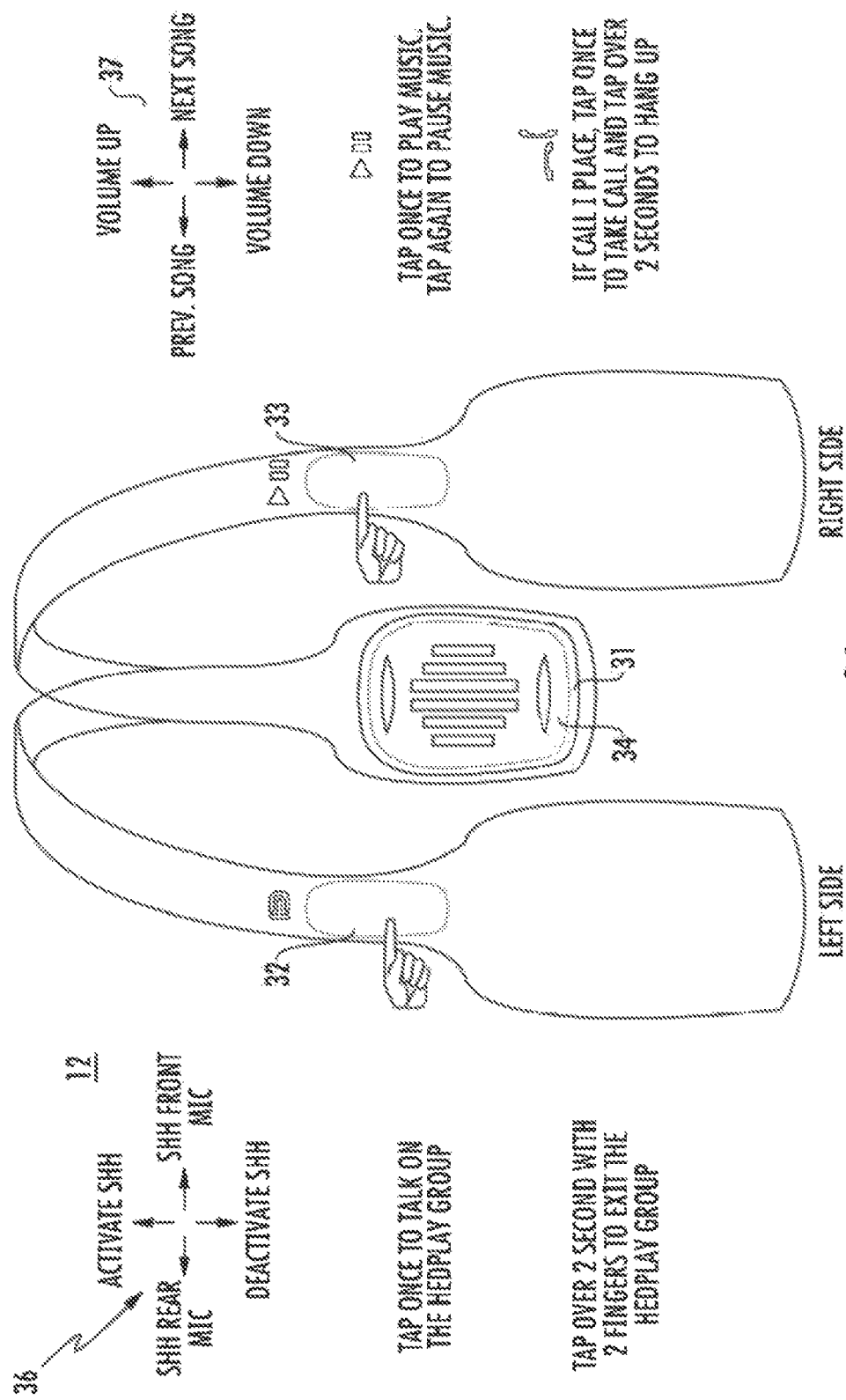
FIGS. 3A-3C are schematic diagrams of a HEDphone concept.
Figure 3C:
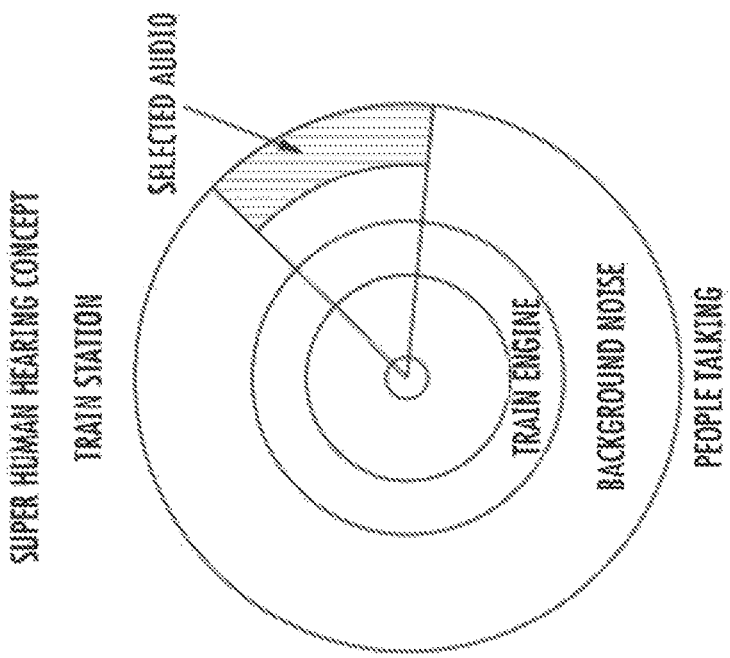
Figure 3B:
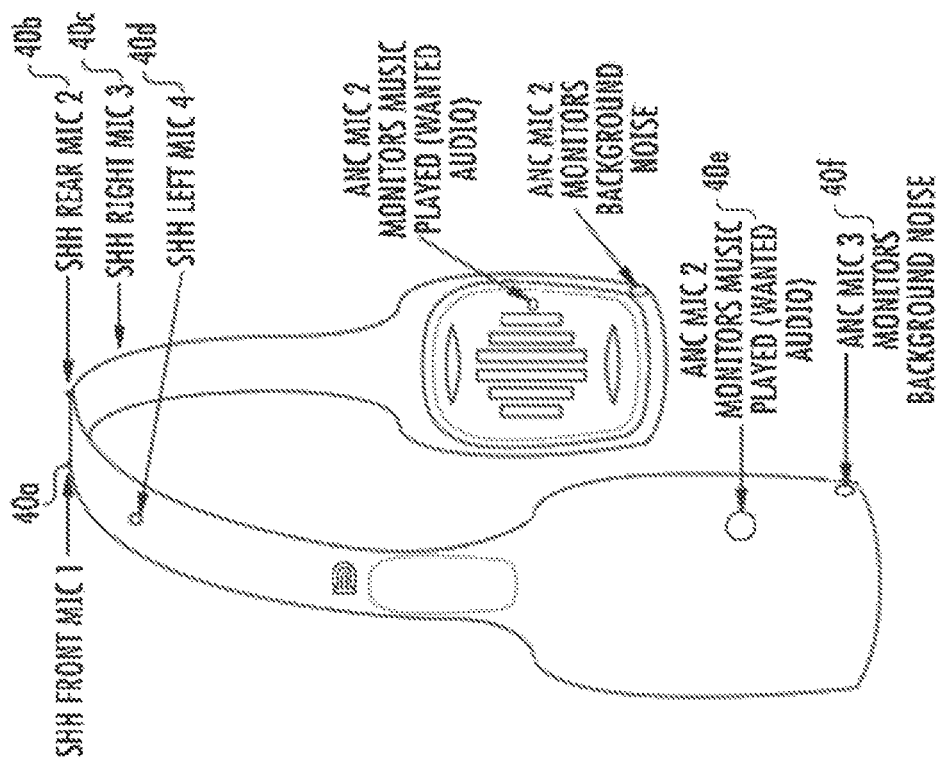

An example HEDphone 12 is shown in FIGS. 3A-3C. HEDphone 12 can have a power On/Off switch 31. For example power On/Off switch 31 can incorporate a dual color LED 34, Blue and Green. An example scheme for color LED 34 is described below. When turned On, LED 34 will be fixed blue. When charging, LED will flash Green until turning fix green when fully charged. If HEDphone 12 is operating in a group (HEDmesh) the LED will turn to green. If HEDphone 12 comes out of the group it will go back to Blue. HEDphone 12 is turned On and Off by pressing On/Off switch 31 for more than a second, whilst the HEDphone 12 is turned On, it will always be in "paring mode" or discoverable by any portable device. HEDphone 12 can be operated as follows:

Turn Bluetooth to the ON position on mobile device 18:
1. Search for Bluetooth devices.
2. Select HEDphone 12 from the result list.
3. optionally Enter pin code 0000.

Bluetooth pairing and HEDphone 12 functionality must be possible even if the user has not downloaded the HEDapp mobile application. If the application is not downloaded the HEDphone 12 will default to the factory settings. These settings can only be changed by downloading the HEDapp.

Referring to FIG. 1, once HEDphone 12a is paired to mobile device 18, it will automatically enable the WiFi function to allow other HEDphones 12b-12n to connect to it via Wifi Direct, or via the NFC (Near Field Communication) function. This functionality is also be possible if HEDphone 12a is connected via an audio cable to mobile device 18 rather than with a Bluetooth link. In this mode, (with cable) HEDphone 12a can turn off the Bluetooth link automatically in order to save battery. This function may be overwritten via the HEDapp. This will allow the connection of the HEDphone 12 to a laptop using the audio cable while still being connected to mobile phone 18 via Bluetooth.

Once the HEDapp is downloaded, the user will enter his/her HEDphone's name which will then be displayed on the app and on HEDmesh 14 when in use.

HEDmesh 14 can be created to stream music, to talk to other HEDmesh members or for both. When HEDmesh 14 is created or a new HEDphone 12a-12n joins the group, an audible tone can be played on HEDphones 12a-12n and the HEDapp user's list will be updated with the new user/player's name.

HEDmesh 14 can be created by any HEDphone 12a-12n user who will become the administrator or master and will control the audio played to HEDmesh 14. Other HEDphone 12a-12n users can join the group via NFC with any HEDphone 12a-12n already in HEDmesh 14 and not have to find who the master is. Every time a new player joins the group, the master and all other users/players will receive an audio tone and everyone on HEDmesh 14 can see an updated list.

HEDphone 12a-12n users can create a private HEDmesh 14 where only "approved" members may join. Private HEDmesh 14 groups can be saved for later use and all subscribed members can connect automatically when they are next in proximity. At the same time the administrator of the private Group can block and expulse a HEDphone user at any time, whether in range or not (from the HEDapp group). It should also be possible for a user to join a HEDmesh but to listen to its own music and only use the HEDmesh to communicate to others. This can only be achieved using the HEDapp, but it can be set to "talk lock" in the HEDapp. If talk lock is ON on the HEDapp the user can simply tap the HEDtak button to lock the channels. Rules may be then introduced to limit the number of simultaneous conversations.

Several HEDmesh 14 groups may coexist in the same area.

While users are on a HEDmesh 14, they can talk to each other by pressing the HED capacitance pad 32 on the HEDphone touch pad shown in FIG. 3A. For example, this function can be operated by tapping once to talk on the HEDmesh group, tapping over 2 seconds with 2 fingers to exit the HEDmesh group. HED capacitance pad 33 can be operated, for example, by tapping once to play music and tapping again to pause music. If call in place, for example, tap once to take call and tap over 2 seconds to hang up. HED capacitance pad 32 controls the sharing and HEDmesh functions. HED capacitance pad 33 controls all phone and music functions. HED capacitance pad 32 can operate functions 36 of activate SHH, deactivate SHH, activate SHH rear microphone and activate SHH front microphone. HED capacitance pad 33 can operate functions 37 of volume up, volume down, previous song and next song.

Any user on HEDmesh 14 should be able to take the call, text and carry out other function on portable device 18 without affecting the HEDmesh communication.

If a user receives a phone call while on HEDmesh 18, the user can take the call without affecting the rest of the users in the group. As soon as a phone call is finished and the user hangs up it should be able to hear the audio streaming from HEDmesh 18. HED capacitance pad 33 positioned above speaker 34 can be used for controlling the audio source and the phone functions of HEDphone 12. For example, HED capacitance pad 33 can control volume up, volume down, next song, previous song, pause music, play again, take calls and hang up calls.

HEDphone 12 can include a battery. The battery preferably provides 15 hours of Bluetooth use for music and at least 10 hours for HEDmesh operation. The battery may be charged while in HEDphones 12 by using the micro USB cable or by using an external cradle. Alternatively, the battery may be charged by induction with a special cradle or hanger. A larger battery can also be fitted in a cavity of HEDphone 12.

HEDphone 12 can be fitted with a mini jack socket to allow the user to bypass the Bluetooth link. This will allow the user to save battery, obtain better audio and avoid latency. On the HEDapp the user will be able to select if the Bluetooth link is to stay live while using the cable but the system will default it to Off. HEDphone 12 can provide a HIFI quality audio when operating with cable even when the battery is flat. In this mode, (with cable) HEDphone 12 can turn off the Bluetooth link automatically in order to save battery. This function may be overwritten via the HEDapp. This will allow the connection of the HEDphone to a laptop using the audio cable while still being connected to a mobile phone via Bluetooth. This socket can support an aux microphone input in case an extra microphone boom is sold as an accessory for the HEDmesh 18. All other settings and functions for the HEDphone will be adjusted and controlled via the HEDapp.

In one embodiment HEDphone 12 provides a feature referred to as Super Human Hearing (SHH). SHH goes beyond conventional ANR (ambient noise reduction) with additional features that allow the user to control their aural environment by being able to directionally increase or decrease selective frequencies. This will allow the user to attenuate specific sounds around them. Conversely, the user will also be able to single out and amplify other sounds around them. For example, while exercising (running, skiing, cycling, etc.), users may be able to emphasize the sound levels behind them to help them hear if someone or something is approaching too close behind them; all of this while still enjoying their music.

In this embodiment, HEDphone 12 can be fitted with a plurality of unidirectional microphones 40a-40f or an array of omni directional microphones in addition to the ones used for ANR as shown in FIG. 3B. The microphones will be located in various places on the device pointed in various directions in order to achieve a 360° audio image of the environment around the user. By a method of mixing the audio from the various inputs, the user will experience a new way to control the way they hear the world around them as shown in FIG. 3C. The user will be able to intuitively control SHH visually with the aid of a controller app for their mobile phone or device. SHH functionality can include the following features:

1. The ANR function will work as they exist on standard headphones. The user can either activate or deactivate ANR independently of SHH.

2. The additional microphones dedicated for the SHH function will pick up directional ambient sounds separately from the ANR microphones.

3. The user will be able to control the SHH function with the aid of a 3D visual app for their mobile telephone or device.

4. Reinserted into the signal path of the user's audio stream.

5. SHH function will allow the user to allow ambient noise at user-defined frequencies to filter into the HEDphone via the fitted microphones. For example, this new feature could allow the user to hear other people talking to them without having to remove the HEDphones or having to pause or mute the music. Users that wear headphones while walking, cycling or doing any other type of activity that requires some level of awareness of their immediate surrounding will greatly benefit from this new feature as well as increasing safety. The user will then be less likely to remove their headphones.

6. The user will be able to control the direction and frequency of the sounds they want to enhance.

7. A combination of both SHH and conventional noise reduction will allow the user to pass through the ambient noise but to also cancel out any noise from the "wanted" audio signal such as human voice. The idea is that if someone is talking to the headphone user in a noisy environment, the background noise can be cancelled out from the human voice, making the headphone a tool to communicate in noisy environments, where it would be clearer to communicate with the headphones than without them.

8. Amplification of the "good" inbound audio (human voice) to aid human hearing for people with difficulties, to be able to communicate in noisy environments or simply, to allow you to communicate without removing the headphones and hear better than without them. This may have a different level adjustment to the music level and it may require a separate mode activated in the HEDapp which we will also give control between the rear and forward mic in the headband. The HEDapp will provide a visual representation of the audio world around them.

The SHH functionality can be based on four adjustments.
 a. Noise reduction level (gradual adjustment of the noise reduction level). This adjustment will be independent of the inbound audio level.
 b. Forward mic and rear mic levels (for good audio)
 c. Music volume. Adjusts the music level.
 d. Inbound audio level for the talk mic (the one used to talk to the HEDmesh and telephone) must be muted.

The SHH must be achieved by dynamically adjusting the levels above. These adjustments maybe carried out by sliding the finger over the HEDpad up and down for volume and right and left for rear mic and front mic gain. To make it easier to the user there should be some pre-determined modes to be set via the HEDapp.

Some of the modes could be:
SHH On/Off
Bicycle
Factory
City walk
Windy
Home

HEDphone 12 can support the following functionalities without HEDapp.

Pairing to a portable device, play music and music controls, support phone functionality, create a HEDmesh network, stream audio to the HEDmesh network, able to talk to HEDmesh participants within the network and activate and control the Super Human Hearing function.

Figure 4:
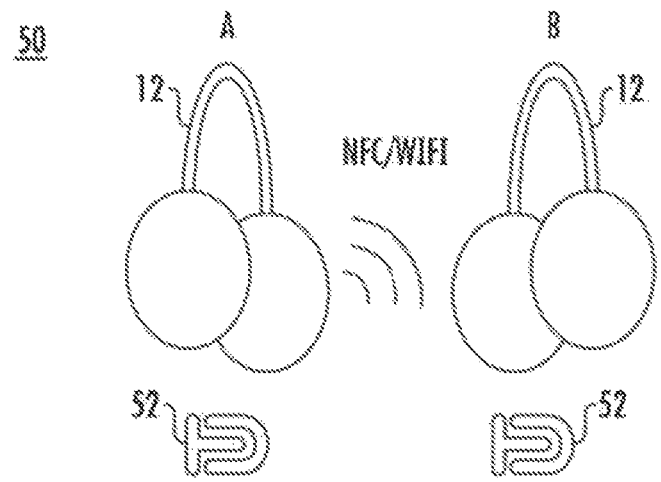
FIG. 4 is a schematic diagram of a HEDmesh network of HEDphones.

To connect HEDphones 12, a NFC device can be activated in one HEDphones 12. This can be achieved by shaking one HEDphones 12 and getting them together facing the NFC side (HEDshake). Alternatively, a HEDmesh button can be activated with a HED button. This will create a sharing network between 2 or more HEDphones 12. This network will be created automatically by randomly allocating one of HEDphones 12 as a hotspot. The NFC time required is about 2 seconds. The new network is referred to as HEDmesh 50, as shown in FIG. 4.

Basic HEDmesh Network.

At this stage, both HEDphones 12 can talk to each other by pressing HED button 52 "" or by activating the required action on capacitance pad.

Figure 5:
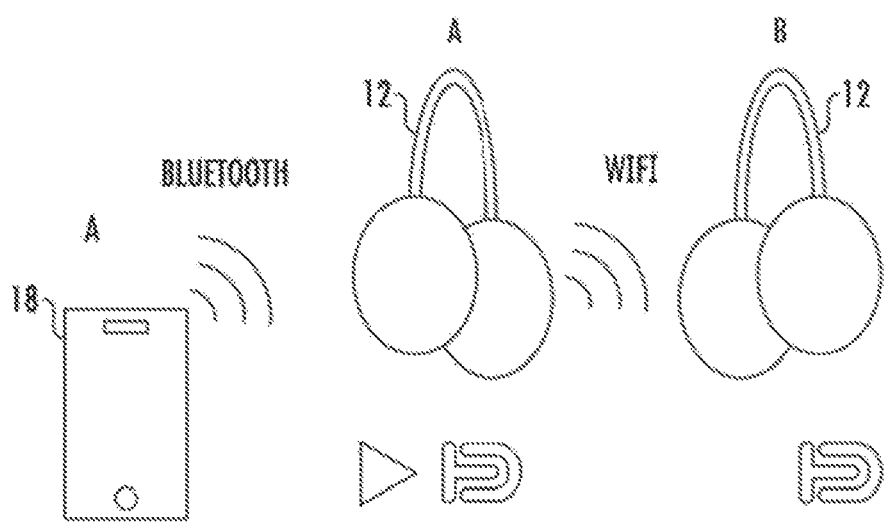
FIG. 5 is a schematic diagram of a HEDmesh network of HEDphones including a mobile device.

In a first scenario shown in FIG. 5, when HEDphones 12a is paired to mobile device 18 via Bluetooth they will be able to:

HEDphone 12a (connected to a mobile device) can play music, share music and talk to other HEDphone 12b in the network (HEDmesh).

HEDphone 12b can only talk. As soon as user A starts playing music, it is automatically sent to HEDphone 12b.

Music and voice can play simultaneously. When there is voice present on the HEDmesh network, volume of the music can be lowered.

Figure 6:
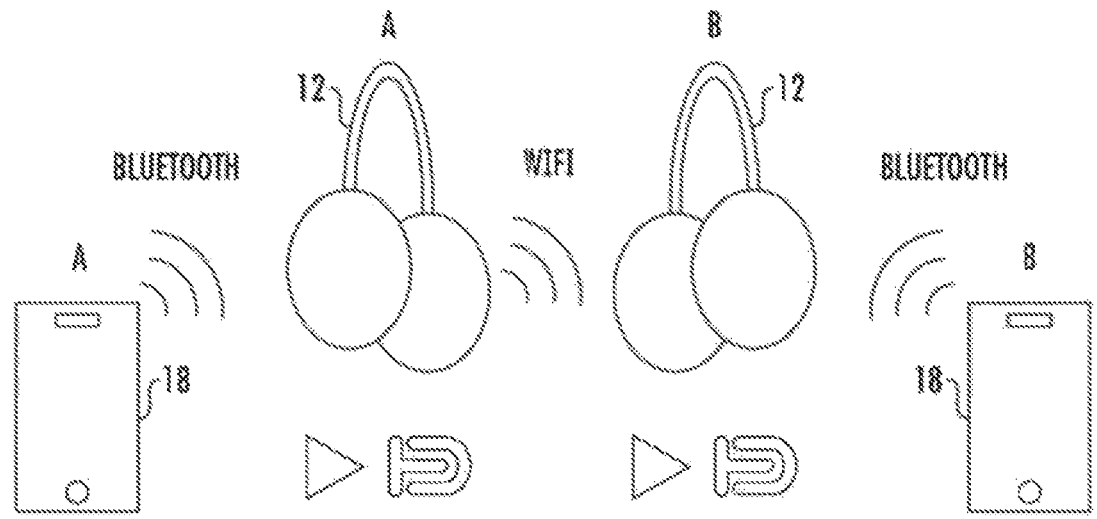
FIG. 6 is a schematic diagram of a HEDmesh network of HEDphones including a plurality of mobile devices.

In a second scenario shown in FIG. 6, when two or more HEDphones 12a and 12b are paired to mobile devices 18 via Bluetooth.

In this case, all HEDphones 12a and 12b can play music, share music and talk to other HEDphones 12 in the network (HEDmesh).

The HEDmesh network can have a predetermined number of players, for example a maximum of 15, and a maximum number of simultaneous voice calls, for example a maximum of 6. Every user will be able to play music to the HEDmesh network. Pressing play in their mobile devices, will override the current music player (Host) becoming the new HEDmeshHost.

A headphone user can leave the HEDmesh network when:
 1. He/she goes out of range
 2. Turn the HEDphone OFF
 3. Battery goes flat
 4. Pressing HED button 

LEDs will indicate the users when he is on a HEDmesh or not there should also be an audible tone for entering and exiting a HEDmesh session.

When HEDphone 12 leaves the HEDmesh session, all data will be erased from all users in the HEDmesh.

To re-join the HEDmesh, it will have to go to one of HEDphones 12 already in the HEDplay session and use the NFC logging method.

When leaving the HEDmesh network there could be two scenarios:
 1. The user leaving is the network Host:
 In this case, the entire HEDmesh will stop hearing the music until another remaining user presses play in one of their mobile devices. The network is not dissolved, so another user within the HEDmesh network becomes the hotspot. If the hotspot left and there was already someone playing music, this user will become the hotspot automatically so the music is only interrupted momentary.
 2. The user leaving is not the network Hotspot:
 In this case, the rest of the HEDmesh network carry on operating normally, unless the user leaving was the one playing music which will obviously stop the music on the HEDmesh until another player presses play.

If a HEDplayer (HEDphone 12 user within a HEDmesh network) receives a call, there are two possible scenarios:
 1. The HEDplayer is Playing Music:
 In this case, the music stops on the HEDmesh and any other user, already in the same network, can take over by pressing play in their mobile device. Music is then sent to all players except the one on the phone call. As soon as the phone call finishes, the player will automatically hear the music being played again.
 2. The HEDplayer is Not Playing Music:
 In this case, it will simply take the call and stop hearing the music being played in the HEDmesh network. Again, as the call finishes, it will automatically go back to listen what is being played on the HEDmesh network.

Figure 7:
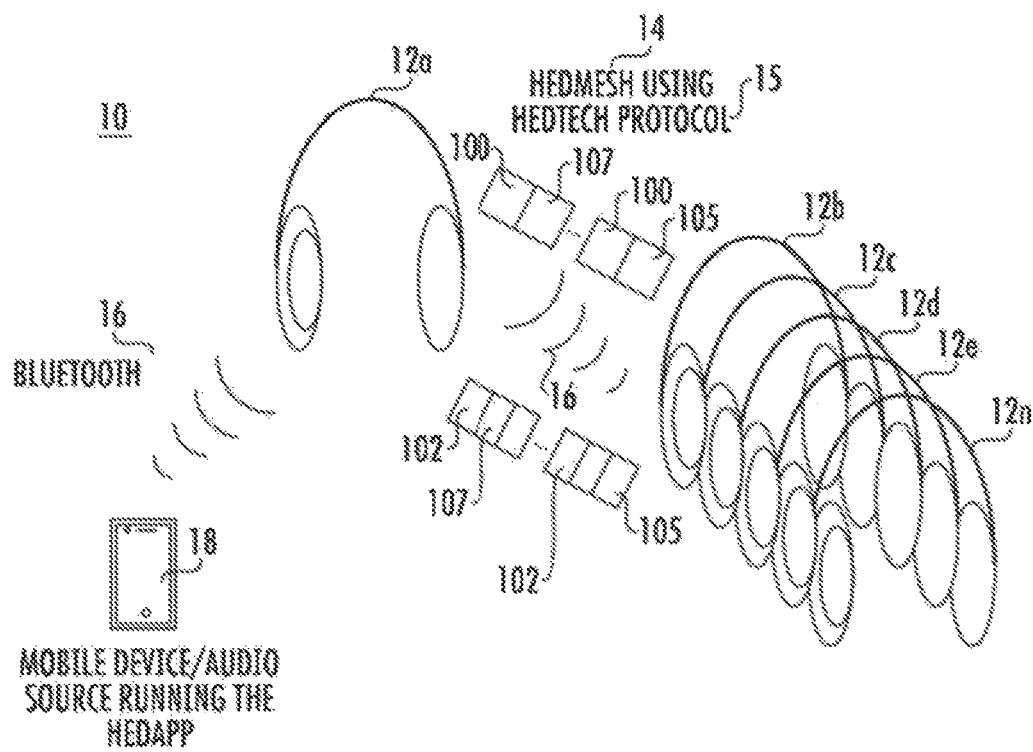
FIG. 7 is a schematic diagram of the system for audio sharing in accordance with the teachings of the present invention.

FIG. 7 is a schematic diagram of an embodiment of HEDtech protocol 15. In this embodiment, HEDphone 12a is considered the master or Host as the headphone playing music and HEDphones 12b-12n are considered as users or Guests as the headphones listening to the music being played. HEDmesh 14 uses HEDtech protocol 15 to provide audio streaming from HEDphone 12a to one or more destinations HEDphones 12b-12n. All of HEDphones 12a-12n participating in HEDmesh 14 are able to send and receive low bitrate data over wireless connection 16. For example, data can be used to distribute information and events and talk to each other over a voice channel of HEDphones 12a-12n as described below.

In one embodiment, HEDtech protocol 15 is based on a multicast/unicast datagram data transfer. HEDmesh 14 is created by HEDphone 12a with one or more HEDphones 12b-12n connect to HEDmesh 14, such as by means of a Service Set Identifier (SSID) and Wi-Fi Protected Access II (WPA2) password provided over Near Field communications (NFC) on a pairing event.

Figure 8:
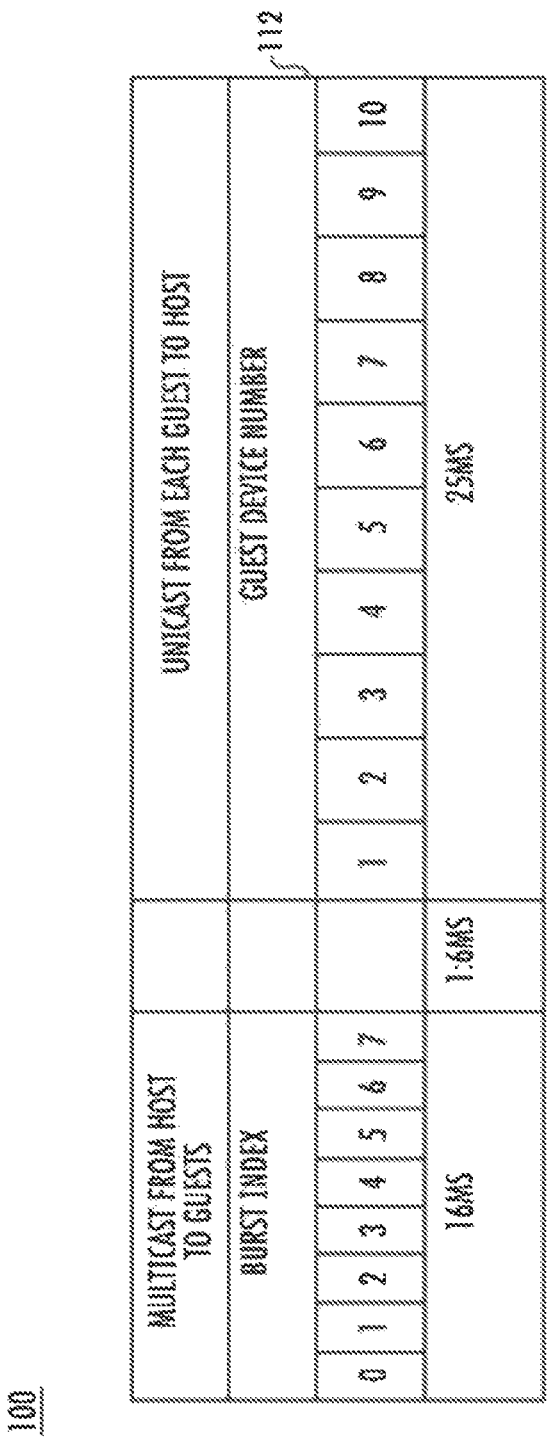
FIG. 8 is a schematic diagram of a packet used in the system.

In an embodiment of HDtech protocol 15, time division can be used in which time is divided in default periods of 42.666 ms. On each time period, HEDphone 12a as the Host will send up to 8 packets 100 to the HEDphones 12a-12n as Guests. Each packet 100 takes about 2 ms to be transmitted. Accordingly, in this embodiment a total of about 16 ms are used to send packets 100 between HEDphone 12a as the Host and HEDphones 12b-12n as Guests. The remaining time of the 42.666 ms period is used by each of HEDphones 12b-12n, in turn, to send acknowledgment and new data, if any, to HEDphone 12a as the Host. There is always a minimum of 1 packet 100 sent by HEDphone 12a as the Host every period. If there is no data to send, a special beacon packet is sent. HEDphones 12b-12n can send packets to HEDphone 12a as packets 102. Packet 100 can be a datagram multicast packets and packet 102 can be a datagram unicast packet as shown in FIG. 8.

On each packet 100 sent by HEDphone 12a as Host there is a list of time instants 112 allocated to each Guests for their reply. This minimizes packet collision over the air and allows dynamic management of the time allocated for the reply of each Guest on each transmission period. Each Guest may reply with none or up to 4 packets 102 on each period.

The duration of the time period is defined by the time between packets with burst index 0 sent by the Host. This means that the default 42.666 ms time period can be changed by the Host, if needed.

In order for the time division to be accurate, synchronisation between the Host and all Guests is required. Wi-Fi network 16 provides synchronisation between the members of a network using an internal timer identical on all members referred to as Time Synchronisation Function (TSF) timer. This timer is incremented every microsecond and the maximum deviation between members of the network is 25 μs. HEDtech protocol 15 determines a time difference between the Time Synchronisation Function (TSF) and the local time which is broadcasted by the HEDphone 12a as Host to all HED phones 12b-12n as Guests, which also get their own difference between Time Synchronisation Function (TSF) timer and a local timer. Based on these two differences, each Guest can then calculate, at any time, what is the corresponding local time in the Host. Audio is synchronized by means of a 32-bit time stamp. At HEDphone 12a as the Host, this time stamp corresponds to the 32 least significant bits of the local time in units of 0.1 ms. At the Guest, the calculation is made on the adjusted local time, so that the generated time stamp matches the Host's time stamp.

Tables 1A-1B define the contents of packets 100 exchanged between Host and Guest. All multi-byte values are represented in little-endian format with a Less Significant Byte first.

Each byte is divided in 8 bits numbered from 0 to 7, with 0 being the Less Significant Byte (LSB) bit.

The contents of packet 100 from Host to Guest are shown in Table 1A as the following:

TABLE 1A

| Offset in bytes | Size in bytes | Name | Description |
| --- | --- | --- | --- |
| 0 | 4 | audio_ts | Audio Time Stamp. For audio streaming, indicates the time stamp at which the contents of this packet should be played. In the special case of a beacon packet, this item holds the 32 LSB bits of "ref_tst_diff". |
| 4 | 1 | nr | Packet number |
| 5 | 1 | codec_type | Codec type for the included audio streaming data. The following types are defined: HED_AUD_CODEC_NONE (0) (no streaming audio available), HED_AUD_CODEC_SBC (1) HED_AUD_CODEC_AAC (2) |
| 6 | 2 | frame_size | Frame size of the streaming audio data. This is the number of bytes on each audio block to be decoded |
| 8 | 1 | sample_rate | Sample rate of the streaming audio data. The following rates are defined: HED_AUD_RATE_NONE (0) HED_AUD_RATE_16000 (1) HED_AUD_RATE_32000 (2) HED_AUD_RATE_44100 (3) HED_AUD_RATE_48000 (4) |
| 9 | 4 LSB bits | burst_size | Burst size. Number of packets in this transmission period (1 to 8). |
| 9 | 4 MSB bits | burst_idx | Burst index. Order number of the packet in this transmission period. Must start with 0 for the first packet and increase by one for each consecutive packet up to "burst size" - 1. |

TABLE 1A-continued

| Offset in bytes | Size in bytes | Name | Description |
|---|---|---|---|
| 10 | 1 | buf_ctrl | Buffer control. Bit mask indicating which buffers in the packet are active. Can be an OR of the following bits:<br>BUF_VOICE(bit 0)—Voice buffer<br>BUF_DATA (bit 1)—User data buffer<br>BUF_STREAM (bit 2)—Audio streaming buffer<br>BUF_CTRL (bit 3)—Control information on the user data buffer (cannot be used together with BUF_DATA)<br>BUF_STREAM_FRAG (bit 6)—Audio streaming buffer holding a partial audio block<br>BUF_BEACON (all bits set)—Special value to identify beacon packets |
| 11 | 1 | reserved | Reserved for future use |
| 12 | 4 | ref_tsf_diff | Difference between TSF timer and local time on Host. This is a 64bit value that is multiplexed on consecutive packets. On each transmission period, the first transmited packet ("burst_idx" = 0) holds the 32 MSB bits. The remaining packet(s) ("burst_idx" > 0) hold the 32 LSB bits. |
| 16 | 10 | reply_win | Reply window start for each Guest in 0.1 ms units, 0xFF for no reply allowed on this frame |
| 26 | 10 | ack_mask | Acknowledge masks sent back to Guests. Each bit corresponds to one packet received in the previous period. |
| 36 | 952 | stream | Audio stream buffer |
| 988 | 32 | data | User data buffer |
| 1020 | 172 | voice | Voice buffer |

The size of each transmitted packet is fixed, independent of its contents. The only exception is the beacon packet that does not include the "stream", "data" and "voice" fields.

The contents of each packet 102 from Guest to Host are shown in Table 1B as the following:

TABLE 1B

| Offset in bytes | Size in bytes | Name | Description |
|---|---|---|---|
| 0 | 4 | audio_ts | Audio Time Stamp. For audio streaming, indicates the time stamp at which the contents of this packet should be played.<br>In the special case of a beacon packet, this item holds the 32 LSB bits of "ref_tst_diff". |
| 4 | 1 | nr | Packet number |
| 5 | 1 | codec_type | Codec type for the included audio streaming data. The following types are defined:<br>HED_AUD_CODEC_NONE (0) (no streaming audio available),<br>HED_AUD_CODEC_SBC (1)<br>HED_AUD_CODEC_AAC (2) |
| 6 | 2 | frame_size | Frame size of the streaming audio data. This is the number of bytes on each audio block to be decoded |
| 8 | 1 | sample_rate | Sample rate of the streaming audio data. The following rates are defined:<br>HED_AUD_RATE_NONE (0)<br>HED_AUD_RATE_16000 (1)<br>HED_AUD_RATE_32000 (2)<br>HED_AUD_RATE_44100 (3)<br>HED_AUD_RATE_48000 (4) |
| 9 | 4 LSB bits | burst_size | Burst size. Number of packets in this transmission period (1 to 4). |
| 9 | 4 MSB bits | burst_idx | Burst index. Order number of the packet in this transmission period. Must start with 0 for the first packet and increase by one for each consecutive packet up to "burst_size" - 1. |
| 10 | 1 | buf_ctrl | Buffer control. Bit mask indicating the type of data included in the packet. Can be an OR of the following bits: |

TABLE 1B-continued

| Offset in bytes | Size in bytes | Name | Description |
|---|---|---|---|
| | | | BUF_VOICE (bit 0)—Voice buffer (2 voice buffers are included when BUF_STREAM is 0) BUF_DATA (bit 1)—User data buffer BUF_STREAM (bit 2)—Audio streaming buffer BUF_CTRL (bit 3)—Control information buffer (cannot be used together with BUF_DATA) BUF_DATA2 (bit 5)—Second user data buffer (cannot be used together with BUF_STREAM, BUF_STREAM_FRAG or BUF_CTRL) BUF_STREAM_FRAG (bit 6)—Audio streaming buffer holding a partial audio block |
| 11 | 1 | reserved | Reserved for future use. |
| 12 | 1 | dev_nr | Guest device number (1 to 10). Assigned when joining the MESH. |
| 13 | 1 | ack_base | Number of the oldest acknowledged packet |
| 14 | 4 | ack_mask | Bit mask with each bit representing an acknowledged packet. Bit 0 corresponds to the "ack_base" packet number. |
| 18 | 1156 | data | Buffer including streaming audio (952 bytes) and/or user/control data (32 bytes) and/or voice data (172 bytes). This buffer must be filled in the following order, depending on the active bits of "buf_ctrl": stream data, voice data, second voice data, user/control data, second user data. The second voice data and second user data cannot be present when stream data is present. |

The size of each transmitted packet is variable, depending on the data being transmitted as defined by the "buf_ctrl" field.

The HEDtech protocol 15 provides a reliable transport layer for streaming audio and user data using an acknowledgement protocol. All packets sent in one direction must be acknowledged in the reverse direction. Considering the different nature of multicast and unicast, a different acknowledge protocol is used, depending on the direction of the transfer.

On each time period, up to 8 packets 100 can be sent from the Host to the Guest. Of these, only 2 of packets 100 can be new packets as never sent on previous time periods. The remaining packets 100 are retransmissions of unacknowledged packets. The Host must maintain, for each transmitted packet 100, a list of successful acknowledgements received from each active Guest. Each packet 100 is transmitted continuously on consecutive time periods until all active Guests acknowledge the packet.

A Guest is considered active whenever the Host receives data from it. When no data is received from a Guest for a defined amount of consecutive time periods, the Guest is then considered inactive.

Each packet 100 sent includes a packet number ranging from 0 to 255. Each new packet is assigned a consecutive number, wrapping to 0 after reaching 255. Each Guest must maintain a list of received packets 100, to be sent to the Host as an acknowledgement, on each time period. The list is composed of a packet number ("ack_base") and a 32-bit mask ("ack_mask"). The "ack_base" packet number corresponds to bit 0 of the mask, while the following bits 1 to N are related to "ack_base"+N packet numbers. This means that, as an example, if "ack_base"=253 (decimal) and "ack_mask"=77 (decimal, corresponding to a binary representation with 24 bits at 0 followed by 1001101), then the following data packets 100 are acknowledged, reading bits from right to left: 253, 255, 0 and 3. The packet number following 255 is 0. Packets with numbers below "ack_base" are implicitly acknowledged too.

Based in the acknowledge information sent by the Guests, the Host determines which of packets 100 transmitted on the last time period were correctly received by all active Guests. Packets 100 that were not received correctly by all active Guests are re-transmitted.

On each time period, up to 4 packets 102 can be sent from the Guest to the Host. Of these, only 2 packets 102 can be new packets as never sent on previous time periods. The remaining packets 102 are retransmissions of unacknowledged packets.

The Host must send acknowledge information to each Guest, on each time period, considering the correctly received packets 102 in the previous time period. The acknowledge information is sent on all packets 100 transmitted by the Host and comprises 1 byte for each Guest sent in "ack_mask" array. Each bit corresponds to the "burst_idx" of a successfully received data packet 102 in the previous time period.

As an example, a particular Guest sends 3 packets 102 to the Host. Each packet 102 is numbered with a consecutive "burst_idx" number from 0 to 2. If the Host only receives the last two packets 102, it will send value 6 (binary 110) in the "ack_mask" entry corresponding to that particular Guest. This will indicate to the Guest that it must retransmit the last two packets 102.

HEDtech protocol 15 allows for simultaneous transfer of streaming audio and user/control data. Packet numbers are used to guarantee that the correct order of packets is preserved. Depending on errors and re-transmissions, successful reception of packets may occur in a different order than the initial transmission. Both Host and Guest must include mechanisms to re-order the received packets, if necessary, before delivering them to the corresponding recipients.

When sending streaming audio, some additional data is included on each packet 100 to allow the Guest to decode and play the audio stream at any point in time. The audio streaming related data can comprise the following components: 32-bit time stamp "audio_ts" to allow the Guest to start playing audio synchronously with all other devices in HDMesh 14; Codec type "codec_type" indicates the codec required to decode the streaming data, example supported codec are SBC and AAC; Frame size "frame_size" indicates the size in bytes of each audio block to decode; and sample rate "sample_rate" indicates the sample rate to play the decoded audio. If the frame size is bigger than the maximum space available for the stream buffer, then the "BUF_STREAM_FRAG" bit of "buf_ctrl" is set in data packets 100 that hold the first fragment of a frame.

User data can be sent from each device to another or to all devices. The Host is responsible for routing user data blocks 105 to their destination. All data is divided in data blocks 105 of 32 bytes. The Host can send a maximum of one data block 105 on each packet 100, while the Guests can send up to two data blocks 105 on each packet 102 when not sending audio streaming simultaneously. Alternatively, audio streaming is sent simultaneously one data block 105 can be sent per data packet 102. The packet numbers are used to keep the correct order of data blocks 105, allowing for a correct re-assembly at the destination device.

HEDmesh 14 requires some occasional information to be exchanged between the Host and the Guests. A mechanism is provided to re-use data blocks 105 on the transmitted packets for this purpose. This is achieved by having a separate identification of control data block in the "buf_ctrl" field of each packet. Control data always has higher priority than user data. This means that if a user data transfer is in progress, it will be interrupted to send control data.

The following control message primitives can be used which are sent as a first byte of the control message:

CTRL_DEV_NR_REQ (0): Request a new device number. Sent by Guests when registering to the Mesh. Includes the MAC address of the new Guest as a parameter in bytes 1 to 6 of the control message.

CTRL_DEV_NR_CFM (1): Confirm the new device number request is accepted. The new assigned device number is sent on byte 1 of the control message.

CTRL_DEV_NR_REJ (2): Reject a new device number request.

CTRL_SWITCH_REQ (3): Request a switch between Host and Guest. Sent by the Host with the target Guest device number as a parameter in byte 1 of the control message. The current list of Guests is sent in the beginning of the stream buffer. This message can only be sent after audio streaming is stopped.

CTRL_SWITCH_CFM (4): Confirm request to switch between Host and Guest. Sent by Guest when it is ready to switch to Host. When the current Host receives this message, stops transmissions and switches to Guest with the same device number as the Guest with which it switched.

Voice data can be sent from each HEDphones 12a-12n to all other HEDphones 12a-12n. Voice data is sent as voice data block 107. The Host is responsible for broadcasting all received voice data blocks 107 to all Guests. Voice streaming data is divided in blocks of 172 bytes. The Host can send a maximum of one voice data block 107 on each packet 100, while the Guests can send up to two voice data blocks 107 on each packet 102. Alternatively, audio streaming is sent simultaneously one voice data block 107 can be sent per data packet 102. The packet numbers are used to keep the correct order of data blocks 107, allowing for a correct re-assembly at the destination device. Sending up to two 172 bytes blocks, on each default time period of 42.666 ms, allows for a bit rate of around 64 kbit/s. Any codec supporting that bit rate can be used to encode/decode the voice stream data. Suitable codecs are G.722 and AAC.

Figure 9A:
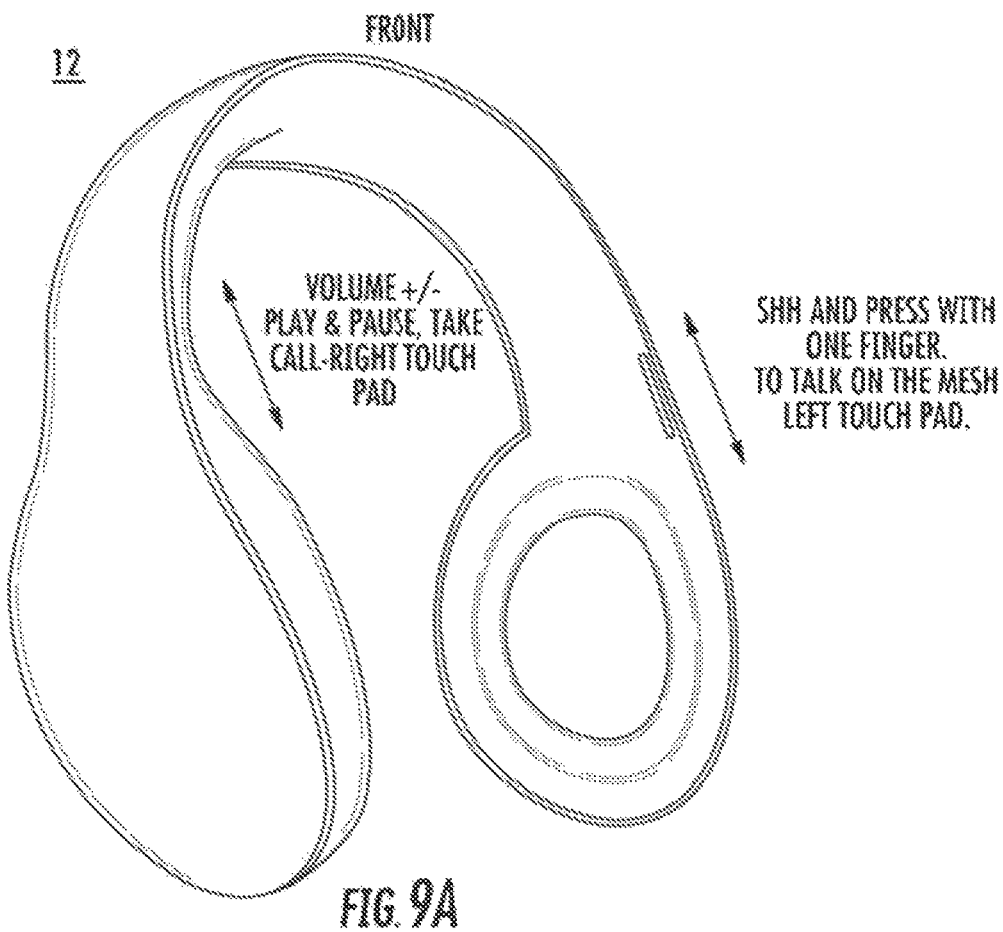
FIG. 9A is a schematic diagram of front view of a HEDphone used in accordance with the teachings of the present invention.
Figure 9B:
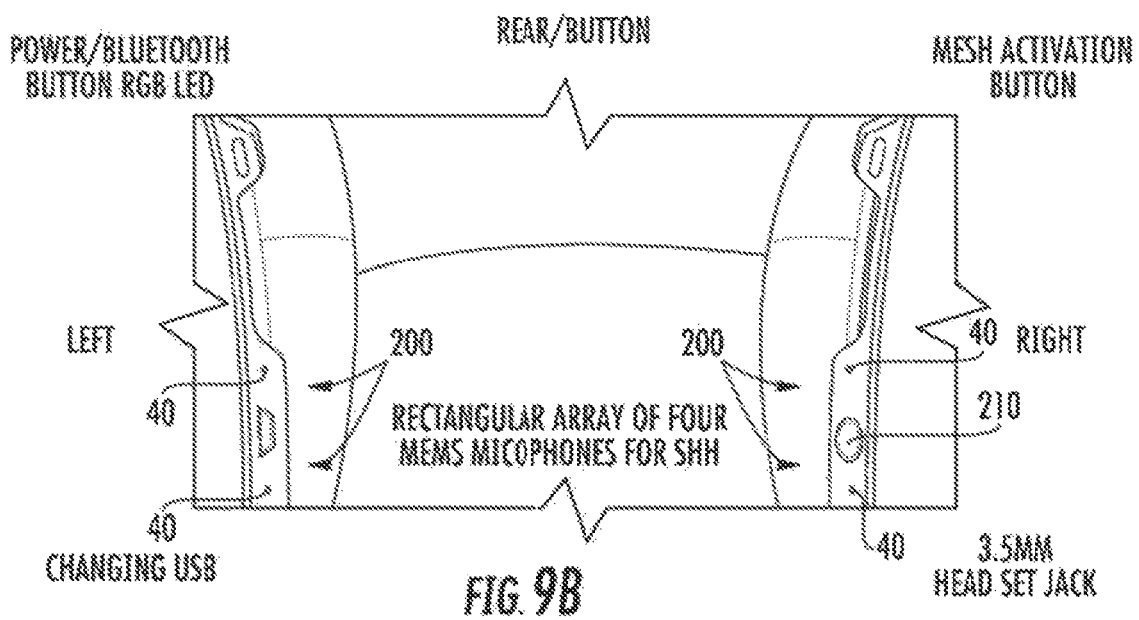
FIG. 9B is a schematic diagram of rear view of the HEDphone.

FIGS. 9A-9B show an embodiment of HEDphone 402 which can be used instead of HEDphone 12. HEDphone 402 is a Hi-Fi stereo wireless headphone which can be us used with HEDmesh 14 and HEDtech protocol 15 as described above. In this embodiment HEDphone 402 includes a rectangular array of omnidirectional microphones 200 of microphones 40a. For example, microphones 40 can be micro-electro-mechanical microphones (MEMS). This configuration allows the implementation integration of Super Human Hearing (SHH) feature described above. This allows the user to enhance or attenuate the outside audio in a selected direction.

Figure 10:
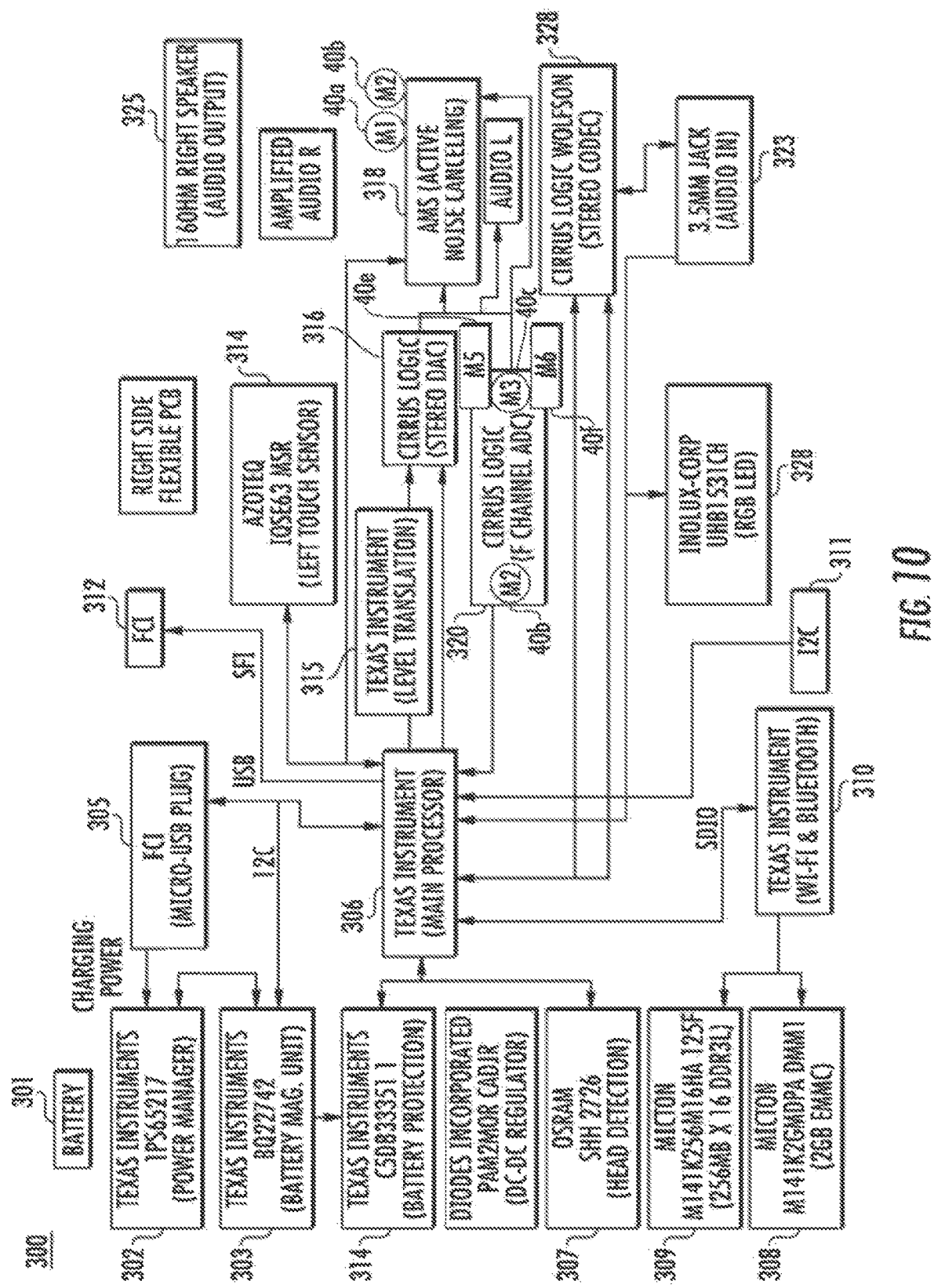
FIG. 10 is a schematic diagram of a printed circuit board that can be used for implementing the right side of the HEDphone.
Figure 12:
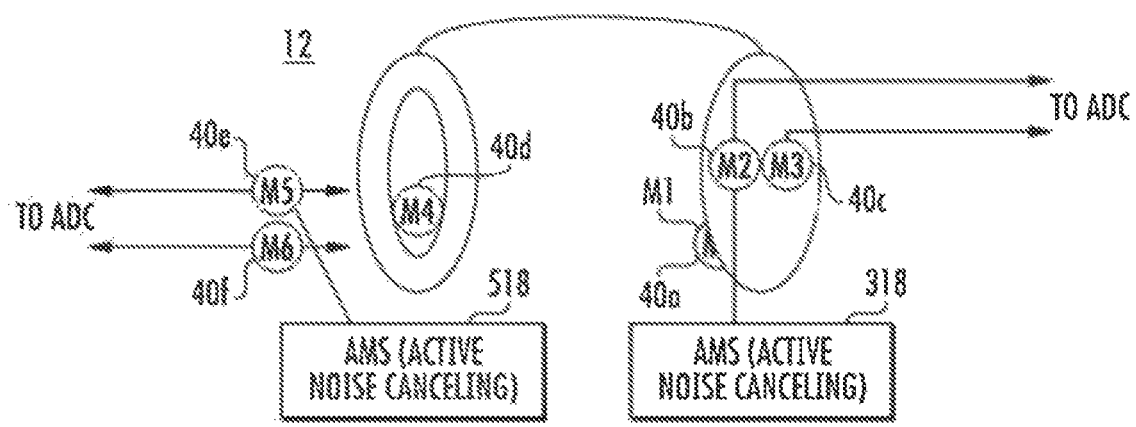
FIG. 12 is a schematic diagram of an active noise cancelling implementation that can be used in the HEDphone.

FIG. 10 is an example implementation of printed circuit board 300 that can be used for implementing the right side of HEDphone 402. Battery 301 is controlled by power manager 302, battery management unit 303, battery protection 304 and FCI 305 for powering processor 306 and diodes 307. Embedded multi-media card 308 and storage 309 are coupled to processor 306. Wi-Fi and blue tooth module 310 and inter integrated bus 311 are coupled to processor 306. Processor 306 controls serial peripheral interface 312. Left touch sensor 314 provides input to processor 306. Level translator 315 interfaces with digital analog converter 316 for controlling active noise control 318 of microphone 40a and 40b as shown in FIG. 12. Four channel analog to digital converter 320 receives input from microphone 40b, 40c, 40d and 40e. Referring to FIG. 10, Codec 322 encode/decode the voice stream data from audio jack 323. Audio output from active noise control 318 is received at speaker 325. LED 328 is controlled by processor 306.

Figure 11:
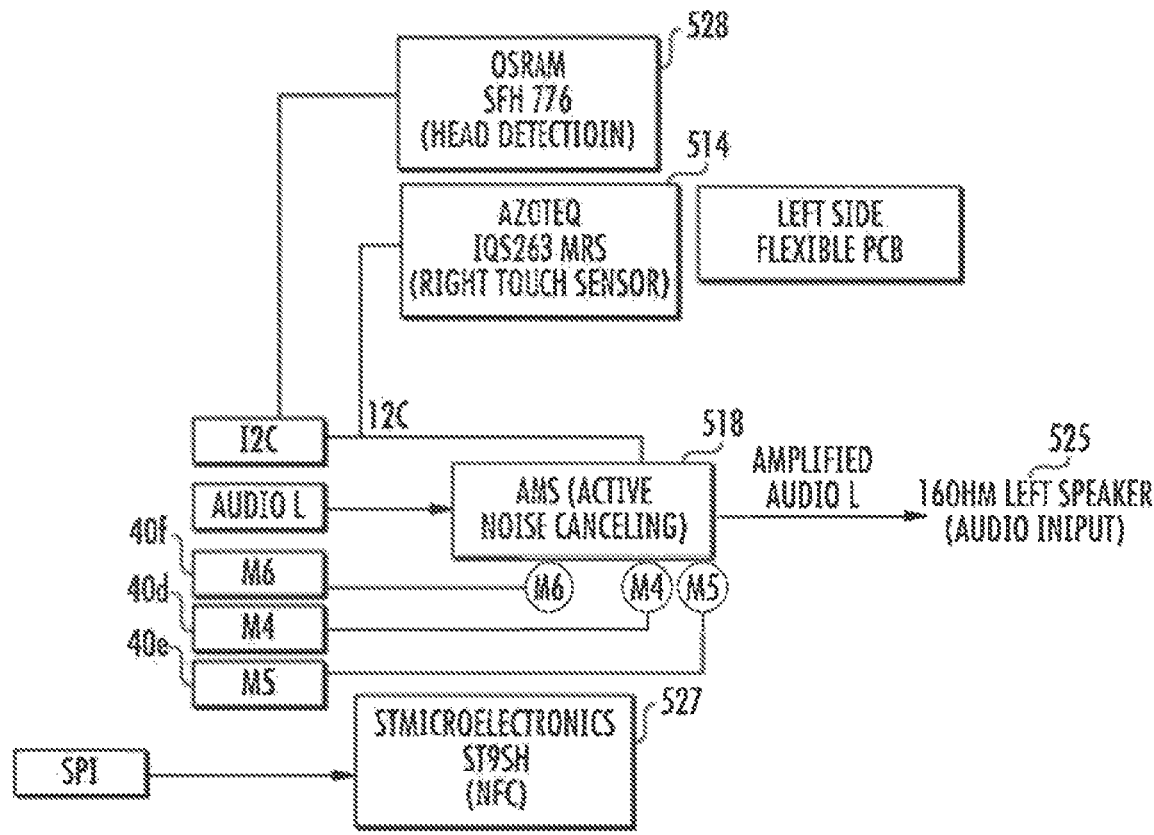
FIG. 11 is a schematic diagram of a printed circuit board that can be used for implementing the right side of the HEDphone.

FIG. 11 is an example implementation of printed circuit board 500 that can be used for implementing the left side of HEDphone 402. Active noise control 518 controls microphones 200 for active noise cancelling as shown in FIG. 12. Referring to FIG. 11, audio output from active noise control 518 is received at speaker 525. Serial peripheral interface 312 interfaces to near field communication 527. Head detection sensor 528 detects the presence of a user's head.

HEDphone 402 can include the functionality shown and the hardware requirements as shown in Table 2.

TABLE 2

| Functionality | Description |
| --- | --- |
| Hi-Fi audio | The Headphones are fitted with superb high quality angled drivers together with an optimised acoustic design. Extra care has also been taken on the codecs, DSP and compression processes, which have also been optimised. |
| Bluetooth and Wi-Fi connectivity | The Headphones connect via Bluetooth with mobile devices and via Wi-Fi with other HED Headphones and Wi-Fi networks. |
| HEDcom protocol | The proprietary HEDcom protocol is for data, audio streaming and communication between compatible HED Headphones. |

TABLE 2-continued

| Functionality | Description |
| --- | --- |
| HED Mesh | Allows up to 11 Headphone users to create a local wireless network to share music, voice and data. |
| Super-human hearing (Shh) | Four omnidirectional MEMS microphones are fitted in the ear pads for Shh, enabling the implementation of virtual directional microphones (beams) by spatial filtering. User can select a direction via the HEDapp, thus allowing the user to hear sound coming from one specific direction. |
| Presence Sensor | The music is paused automatically when the user removes the headphones. |
| Active Noise Control (ANC) | ANC improves the sound quality of music and phone conversation by reducing background noise using inverted phase audio. |
| Audio Equalizer | User adjustable 8 band equalizer via the HEDapp |
| Echo control | Acoustic echo occurs whenever the ear pad microphones capture sound coming from the drivers. The sound from the drivers is delayed long enough (~20 ms) to avoid feedback. |
| Standard telephony | The Headphone is able to answer a call, hear messages and alerts over the music or the Mesh. Also supports voice dialling/voice commands (Siri) |
| Support for VoIP | The HEDcom protocol allows for VoIP communication in the Mesh. |
| Minimised latency | Latency is minimal in the Headphone for music sharing and voice communication so users hear the audio at the same time. |
| Interference | The Mesh co-exists securely with other Wi-Fi networks without receiving or incurring interference with other Wi-Fi networks/devices. |
| Range | Maximum range of 30 m. |
| Home Wi-Fi compatible | The Headphone can connect directly to a Wi-Fi network. User can listen to music via a home music server or other online services. |
| Mobile App (HEDapp) | User Interface to control Headphone functions via Bluetooth from an iOS and Android app. Functionality described in the HEDapp section. |
| Software upgradeable | Headphone firmware is upgradable via Bluetooth using the HEDapp. |
| LEDs | RGB LED to signal power, charging, connectivity with Bluetooth and Mesh connection. |
| Audio sensor for sleep mode | A sensor detects the absence of an audio signal and puts the Headphone into sleep mode automatically. The time to enter sleep mode can be adjusted via the HEDapp. |
| Capacitance touch pad for controls | Two capacitance touch pads exist to control playback, volume, telephony functions, Shh, Mesh, mute and Internal Talk. Touch pad functions are swappable from left pad to right pad. |
| Battery | The Headphone is equipped with 3 batteries totalling 2040 mAh. |
| Auto power off | Enable/disable and set power off time via the HEDapp. |
| On/Off Switch | On/Off Switch |

An example implementation of system 10 in operation of LED 328 is shown in Table 3.

TABLE 3

| Color | LED State | State |
| --- | --- | --- |
| Green | Solid | ON/Not connected |
| Orange | Blinking | ON/Battery Low (20%) |
| Red | Blinking | Charging |
| Red | Solid | Fully Charged |
| Blue | Blinking | ON/BT pairing mode |
| Blue | Solid | ON/BT connected |
| Purple | Blinking | ON/MESH connecting |
| Purple | Solid | ON/MESH connected |

HEDphone 402 can be connected to any Bluetooth device using the standard pairing method HEDphone 402 is turned on and off by pressing the power switch for more than a second. When the HEDphone 402 is turned on it will be in pairing mode, unless the HEDphone 402 has already been paired. While in pairing mode the LED 328 is blinking blue as described above. It will be appreciated that alternative color schemes for LED 328 can be used in accordance with the teachings of the present invention.

Turn ON Bluetooth on the Mobile Device:
1. Search for Bluetooth devices.
2. Select the HEDphone from the result list.
3. Enter pin code 0000. Depending on the Bluetooth version this step may not be required.

Figure 13:
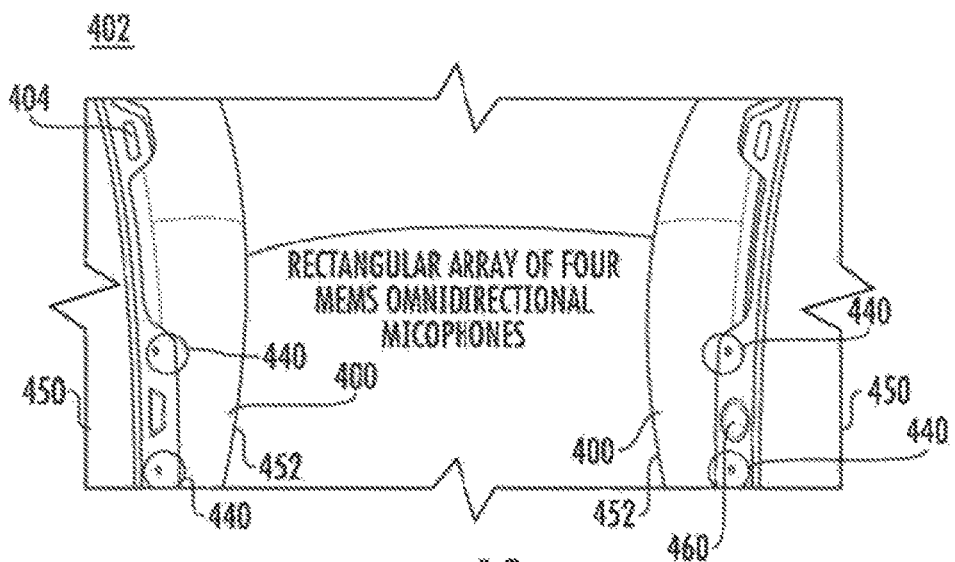
FIG. 13 is a schematic diagram of a super human hearing (SHH) implementation with the HEDphone.

In one embodiment, super human hearing (SHH) can be implemented with HEDphone 402 as shown in FIG. 13. Super human hearing provides control ambient sounds at HEDphone 402 HEDphone 402 is fitted with a rectangular or trapezoidal array of four omnidirectional microphones 440 in addition to the ones used for ANC. The configuration allows the use of different virtual directive/cardioid microphones, by pairs in a line or even combining elements on the diagonal. Microphones 440 are located in lower portion 450 of ear pads 452, mounted in a specific position in order to achieve a 360° audio image of the environment around the user. Ear pads 452 can be one axis touch pads. Ear pad 452*l* can activate super human hearing (SHH) and to talk on HEDmesh 14. Ear pad 452*r* can be used for volume adjustment, for activating playing and pausing or audio and to take a call over HEDmesh 14. Audio received by the several inputs of microphones 440 can be processed by HEDphone 402 to give the user a new way to experience and to control the sound around them.

The HEDphone 402 is fitted with mini jack plug 460 to allow the user to bypass the Bluetooth link and listen to an analogue audio source, such as a music server or service. This allows the user to use sources that don't have Bluetooth. It also saves battery life.

HEDphone 402 still provides a Hi-Fi quality audio when operating with cable even when the battery is flat. While operating with a cable, HEDphone 402 turns off the Bluetooth link automatically in order to save battery. This function may be overwritten in the HEDapp 19. HEDphone 402 can connect to a laptop using the audio cable while still being connected to a mobile phone via Bluetooth.

Figure 14:
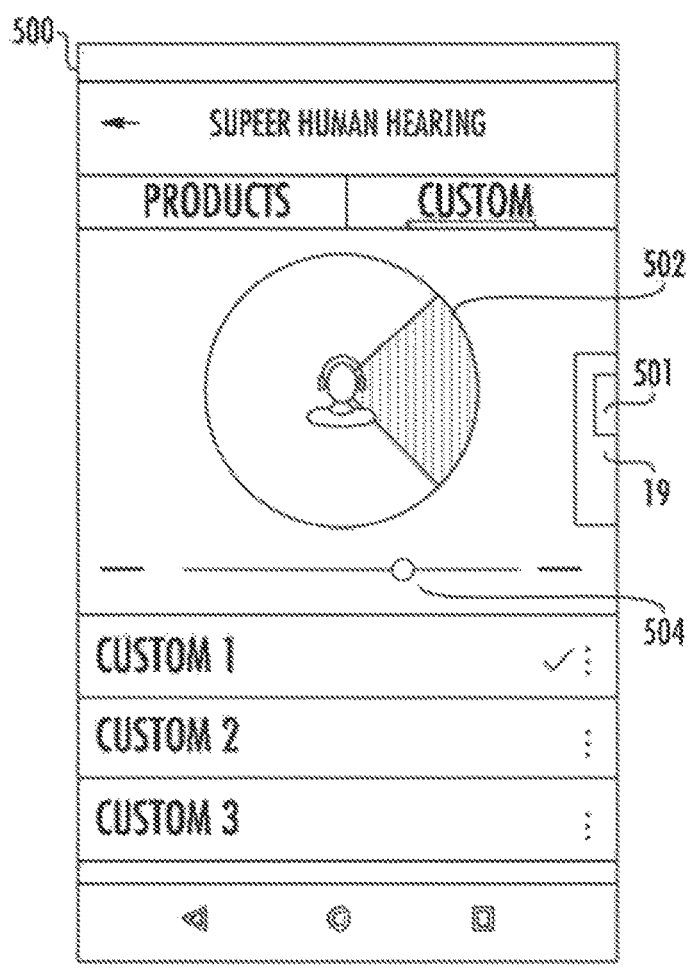
FIG. 14 is a schematic diagram of an embodiment of a HEDapp 19 to allow the user to control super human hearing (SHH) with a graphic interface.

FIG. 14 illustrates an embodiment of HEDapp 19 to allow the user to control super human hearing (SHH) with graphic interface 500. Super human hearing (SHH) is either activated by the user in HEDapp 19 using activation graphic 502 or is enabled directly from HEDphone 402 via activation button 404 shown in FIG. 13. Microphones 440 dedicated for super human hearing (SHH) pick up ambient sounds around the user. A super human hearing (SHH) module 501 in HEDapp 19 analyses and processes the ambient sounds, essentially mapping out the soundscape around the user.

Activation graphic provides access to for super human hearing (SHH) functions in the HEDapp 19 using an intuitive 3d graphical interface that represents the soundscape around them. The user will be able to control the direction of the incoming sound that they want to amplify or to attenuate using control graphic 504. HEDapp 19 provides a visual symbolic representation of the soundscape around the user in activation graphic 502. In the absence of HEDapp 19, super human hearing (SHH) will function in a default mode having a front focus.

Super human hearing (SHH) module 501 of HEDapp 19 provides processed output to be reinserted into the user's audio stream as shown in FIG. 14. The user can enjoy the benefits of super human hearing (SHH) either while listening to music or not. In one embodiment, the super human hearing (SHH) functionality is achieved by the adjustment of parameters in super human hearing (SHH) module 501 as follows:

a. Target sound direction, for enhancement or suppression. This will automatically trigger a configuration of microphone array 400 and processing to be used in in super human hearing (SHH) module 501.

b. Music volume. Adjusts the music level independently of target sound direction and level the in super human hearing (SHH) module 501.

c. Noise reduction level as an adjustment of the noise reduction level for affecting filter adaptation parameters. This adjustment is independent of the inbound audio level and dynamically adjusted automatically.

d. Inbound audio level for the microphone 440 when the user wearing headphone 440 talks, the microphones 440 can be adjusted, through the presence of a near-field voice activity detector.

The adjustment of parameters can be made via HEDapp 19. For convenience, HEDapp 19 has some pre-sets and automatically adjusted settings.

Some examples of possible pre-sets are: Shh On/Off (speech enhancement), Bicycle, Factory, City walk, Windy, Party.

The super human hearing (SHH) function allows ambient sound from user-defined directions to filter into HEDphone 402 via the fitted microphones 440. For example, super human hearing (SHH) could allow the user to hear other people talking to them without having to remove the HEDphone 402 or having to pause or mute the music. Users that wear HEDphone 402 while walking, cycling or doing any other type of activity that requires some level of awareness of their immediate surroundings, will also greatly benefit from this new feature in terms of increased safety.

Figure 15:
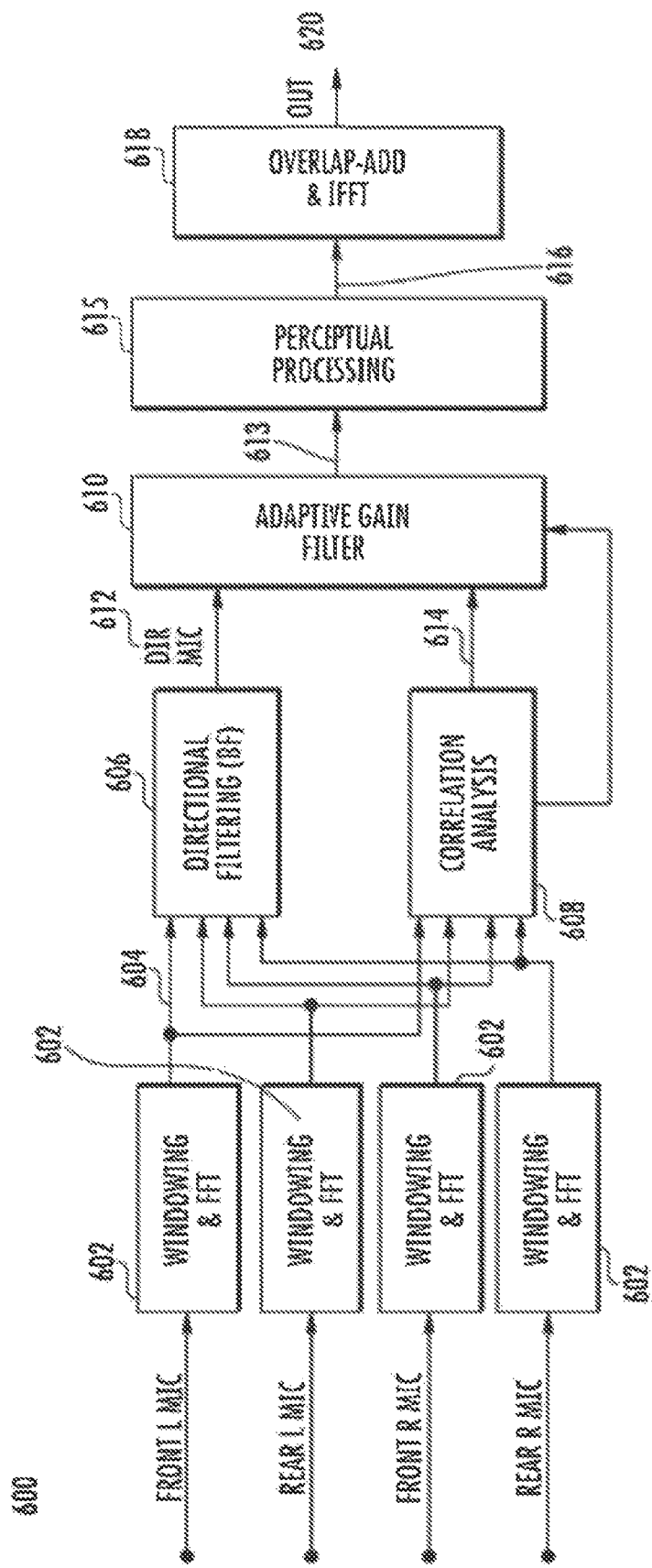
FIG. 15 is a schematic diagram of an embodiment of an implementation of the super human hearing (SHH).

FIG. 15 is an embodiment of implementation of the super human hearing (SHH) by using a combination of beamforming, calculation of correlation and cross-correlation functions with coherency analysis of the various input signals, adaptive filtering to increase or attenuate target sound direction and, perceptually motivated analysis and filtering to further suppress unwanted "noise" in times and frequencies where masking effects would be less effective.

Perceptual filtering is implemented to increase intelligibility of the target direction by suppressing other directions when they would be more disturbing or distracting the perception of the target only, i.e. when masking of the target frequencies over the "noise" frequencies is not effective according to a psychoacoustic model. Noise estimators and thresholds are used to further separate the desired direction signal from disturbing signals.

A further combination of both super human hearing (SHH) and usual, time-domain noise reduction will allow the user to pass through the ambient sound but also to suppress any stationary noise from a target audio signal such as human voice. The purpose is that, if someone is talking to the person wearing HEDphone 402 in a noisy environment, the target direction be privileged (or the disturbing direction attenuated) and at the same time the background noise can be cancelled out from the target sound. This makes of the HEDphone 402 a tool to communicate in noisy environments, where it would be clearer to communicate with the headphones than without them.

Enhancement of the target audio source (human voice) is intended to aid people with hearing impairment, to improve communication in noisy environments beyond the limitations of human perceptions or, simply, to allow communication or raise awareness without removing the Headphones and hear even better than without them.

Input 600 from microphones 400, shown in FIG. 14, can be received at windowing and Fast Fourier Transform modules 602 Output 604 from Fast Fourier Transform modules 602 can be received in directional filtering module 606 and correlation module 608. Adaptive gain filter 610 receives output 612 from directional filtering module 606 and output 614 from correlation module 608. Perceptual processing module 615 receives output 613 from adaptive gain filter 610 and can provide functionality for suppressing other directions when they would be more disturbing or distracting the perception of the target only. Overlap and Inverse Fast Fourier Transform 618 receives output 616 from perceptual processing module 615 to generate output 620.

The implementation of super human hearing (SHH) with the combination of beamforming and correlation analysis in a non-linear microphone array improves effectiveness of adaptive noise filtering. The combination of directive adaptive filtering and correlation analysis with perceptually motivated processing to further reduce spatial and temporal noise signals due to the peculiarity of the masking effects of the human auditory perception. Speech and ambient sound enhancement is provided with control of the direction of the target sound or control of the direction of the attenuated sound. A controllable mixing level between the ambient spatial sound and music playback. The Automatic gain control provides balance of the user own voice level with ambient spatial sound.

Figure 16A:
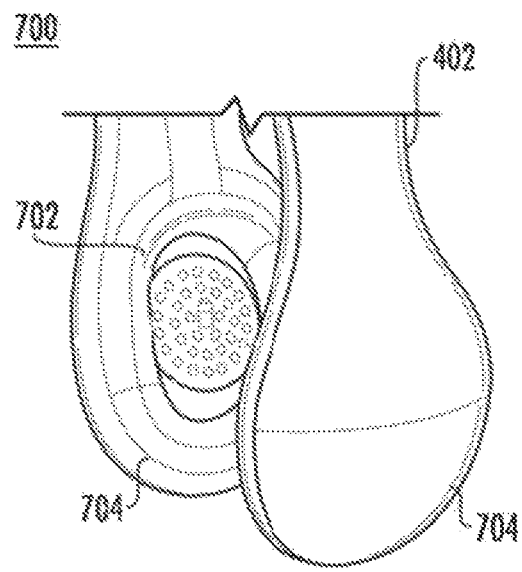
FIGS. 16A-16B is a schematic diagrams of head presence sensor system used with the HEDphone.
Figure 16B:
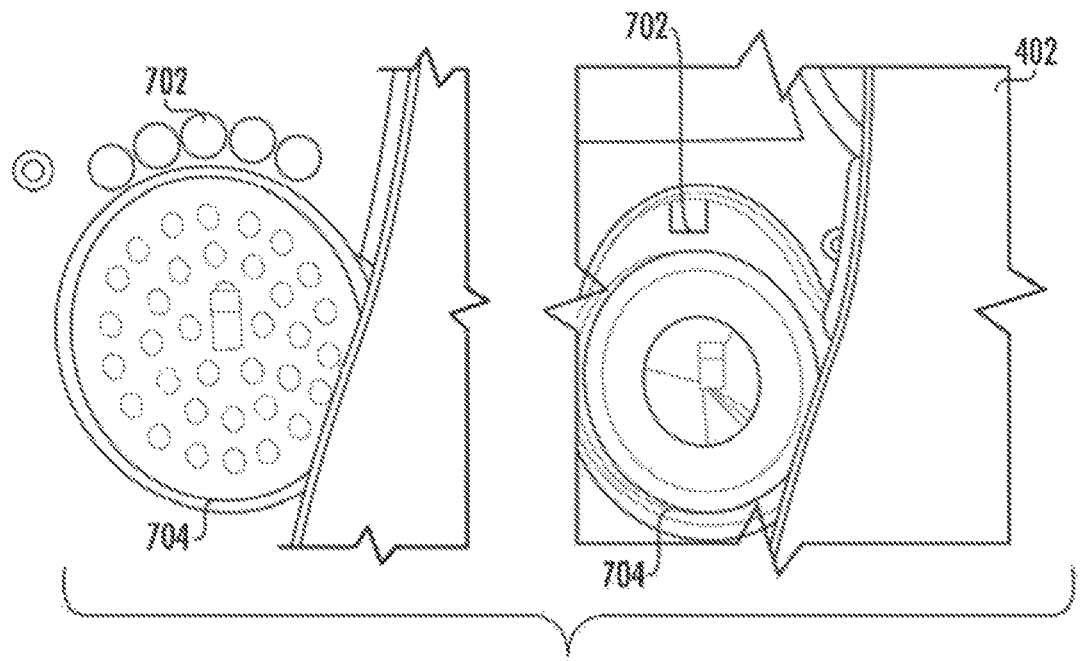

FIGS. 16A-B are schematic diagrams of head presence sensor system 700 which can be used with HEDphones 12 and 402 to detects when the user takes the HEDphone off their head. Sensor 700 can provide a sensing signal to HEDphone 12, HEDphone 402 or HEDapp 19. Upon receipt of the sensing signal HEDphone 12, HEDphone 402 or HEDapp 19 can pause the audio automatically. Upon receipt of the sensing signal HEDphone 12, HEDphone 402 or HEDapp 19 can put respective HEDphone 12 or HEDphone 402 I a Sleep Mode when the absence of a head is detected. Sensor system 700 can include sensor 702 in each ear cup 704. Sensor 702 can be proximity and ambient light sensors such as manufactured by Osram as SF776. Sensor 702 contains an infrared LED (IR-LED) and two detectors and performs two different functions. Sensor 702 registers the ambient brightness and emits infrared light that is reflected by approaching objects, such as your head. Sensor 702 can measure the distance from ear cup 704 to the head and to measure available light within ear cup 704, by combining these two values in software of HEDapp 19. HEDapp 19 can enable or disable the audio, such as music, and other functions such as turning the status LED off while HEDphone 12, or 402 is on the head and status LED 706 is not visible to the user.

HEDapp 19 is an iOS or Android compatible application that can be downloaded such as for free from either the App Store or Google Play. HEDapp 19 provides the user with additional features and access to settings on the HEDphone 12. HEDapp 19 is also a powerful communications and social networking platform, where users can go beyond just connecting their HEDphones 12 to others, they are able to share their music tastes and discoveries, message and communicate with each other.

HEDapp 19 can provide a representation of this HEDMesh 14 with all the user's name and avatars already in HEDMesh 14, describing who is the host and who are the guests, the number of users in the current HEDMesh 14 and the name of this HEDMesh 14. When HEDMesh 14 is created or a new Headphone joins the group, the representation of the Mesh in HEDapp 19 will be updated with the new user/player's name. If enabled, using location services on mobile device 18, users can also see other Headphones 12, 402 in the vicinity that are not already in HEDMesh 14 and create HEDMesh without the use of NFC.

Figure 17:
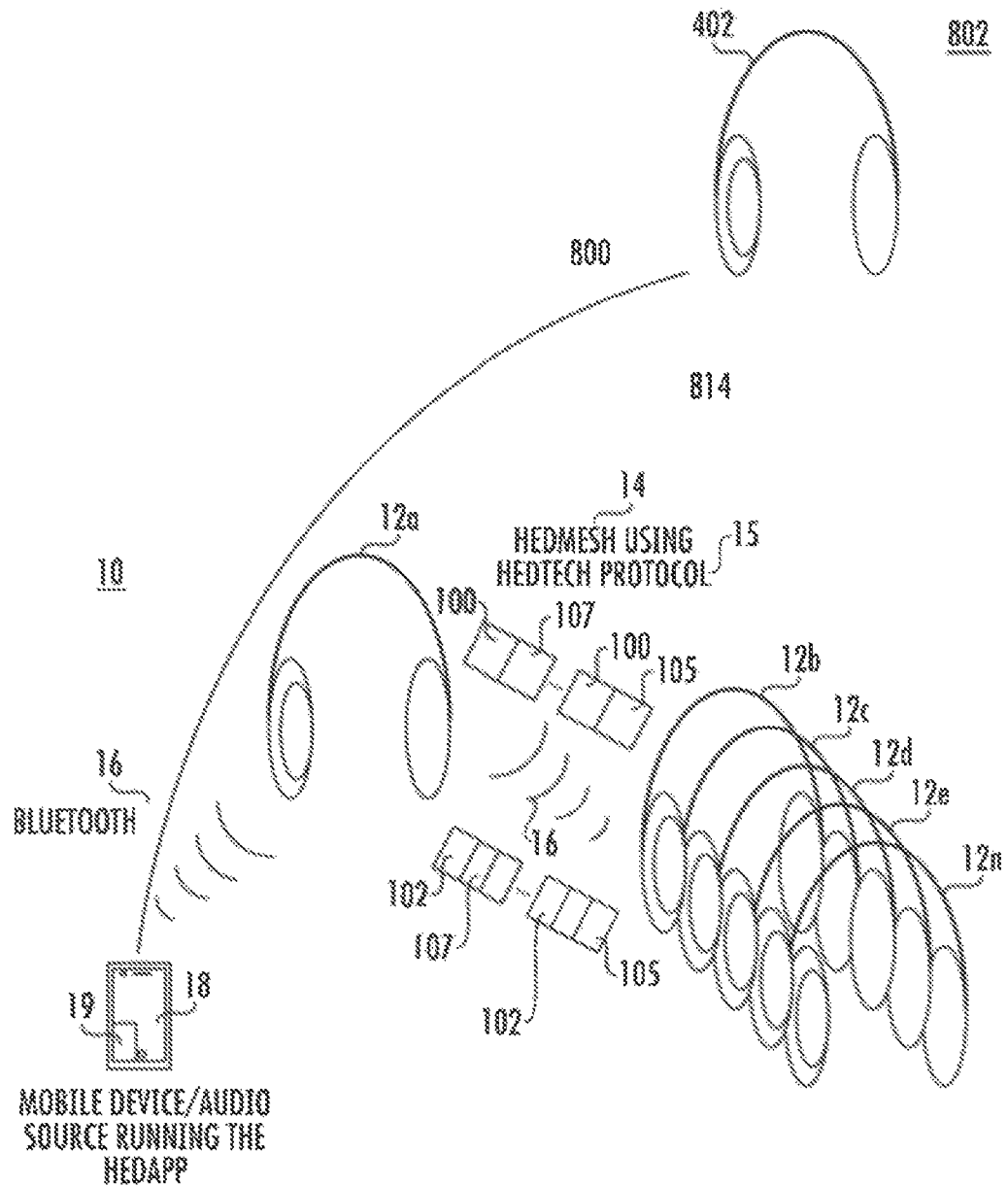
FIG. 17 is a schematic diagram of an embodiment of the system for audio sharing in accordance with the teachings of the present invention.

In HEDapp 19, a HEDMesh 19 can also have Remote Guests. A Remote Guest connects to a HEDMesh 19 via Internet 800 from remote location 802 as shown in FIG. 17. A Virtual HEDMesh 814 may also be created that contain only Remote Guests.

Every HEDMesh 14 and Virtual HEDMesh 814 configuration can be saved by each user in the respective HEDMesh 14 and Virtual HEDMesh 814, and all its guests will be able to recreate this HEDMesh 14 or Virtual HEDMesh 814 with the same Guests and same Host when they are within WI-FI range without using the NFC protocol. The Host can block or expel a Guest from a HEDMesh 14 at any time.

Within the HEDapp 19, a user is able to create a Private HEDMesh 14 where pre-approved members may join. A Private HEDMesh 14 may be saved for later use and all subscribed members should be able to connect automatically when they are next in proximity. At the same time, the Host of the Private HEDMesh may block and expel a Headphone user at any time, whether in range or not.

More than one HEDMesh 14 may coexist in the same area.

HEDapp 19 will allow the user to change, store and recall parameters of the supper human hearing SHH feature described above. Using a 3D graphical interface, the user will be able to adjust the volume and direction of incoming sound. The user will also be able to change the level of the incoming sound respective to the audio already playing in the HEDphone 12 or 402.

Figure 18A:
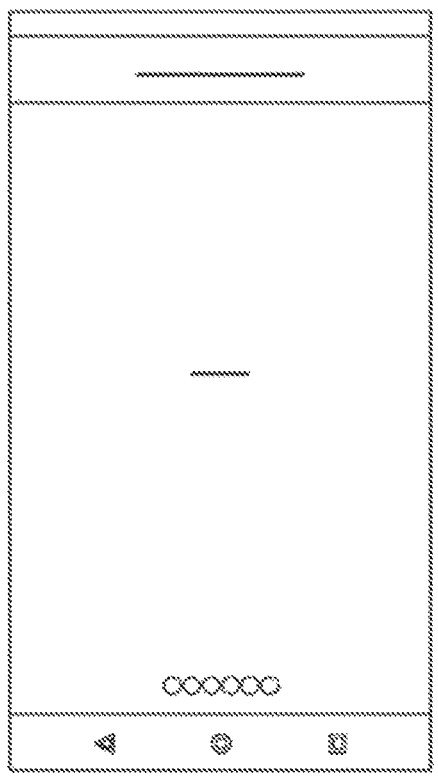
FIGS. 18A-R are schematic diagrams of screen shots of a 3D graphical interface generated at the HEDapp.
Figure 18B:
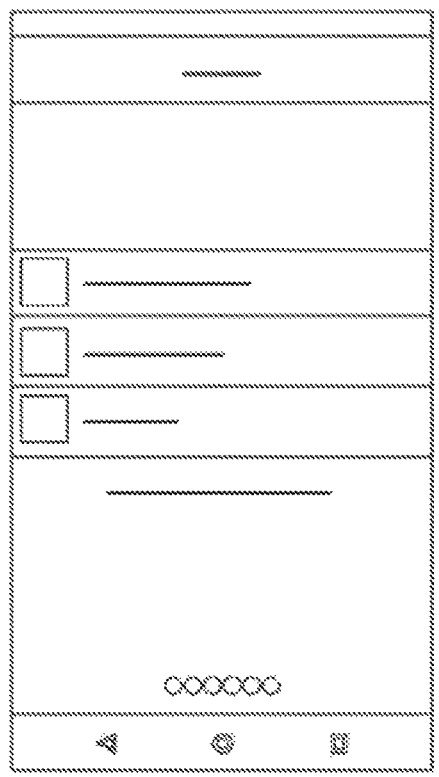
Figure 18C:
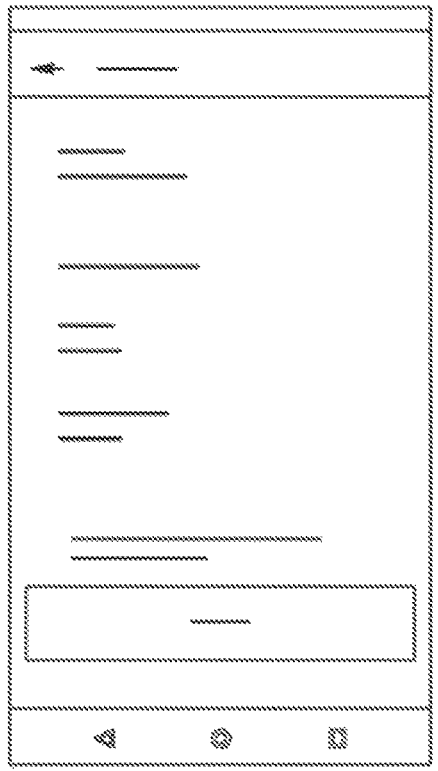
Figure 18D:
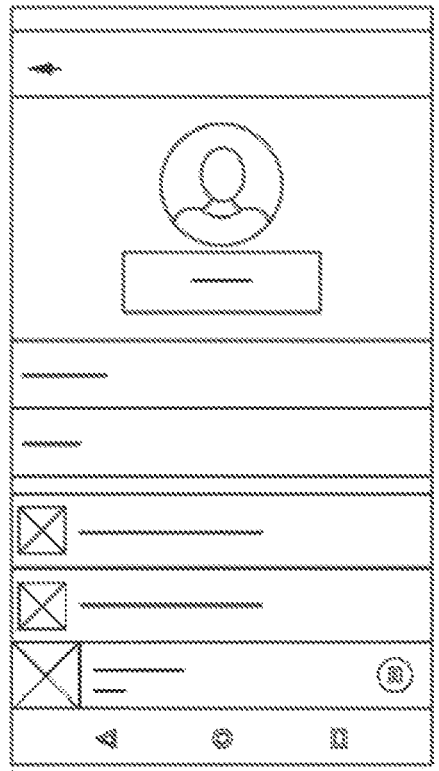
Figure 18E:
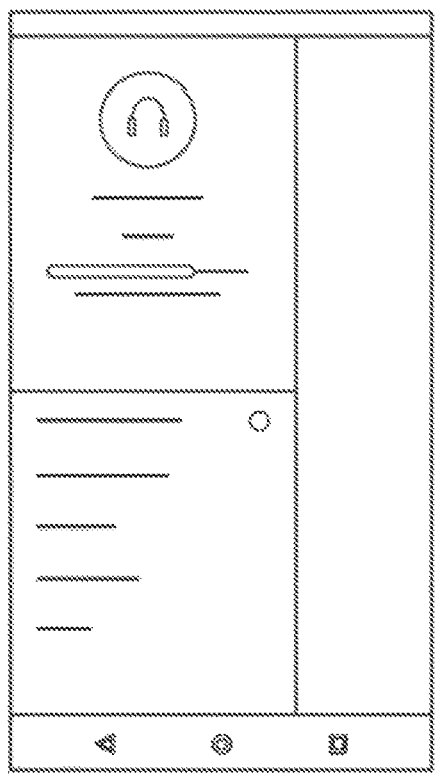
Figure 18F:
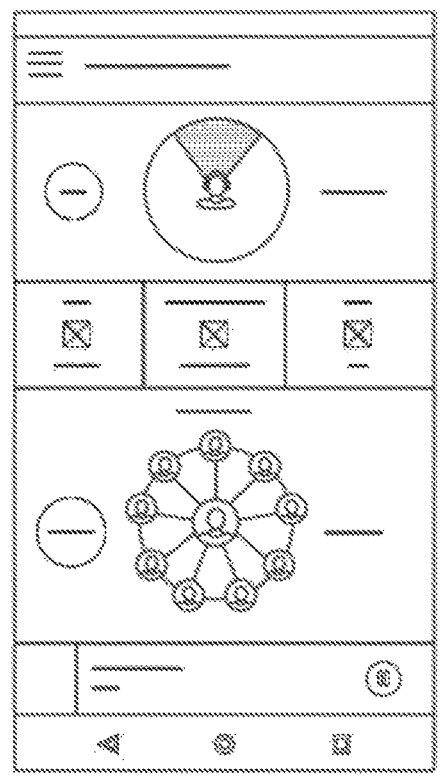
Figure 18G:
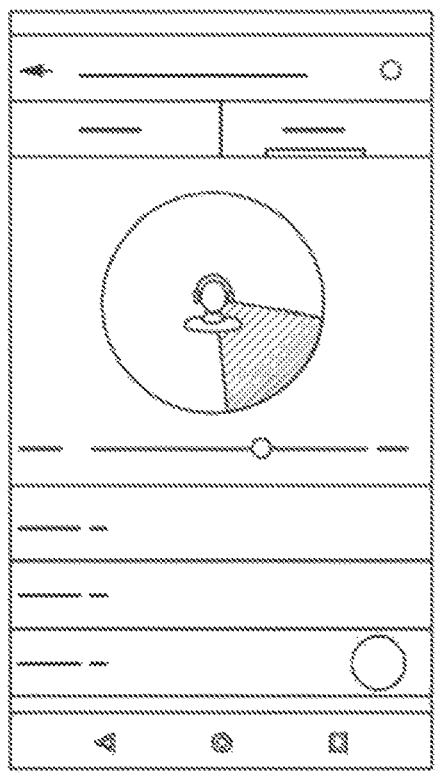
Figure 18H:
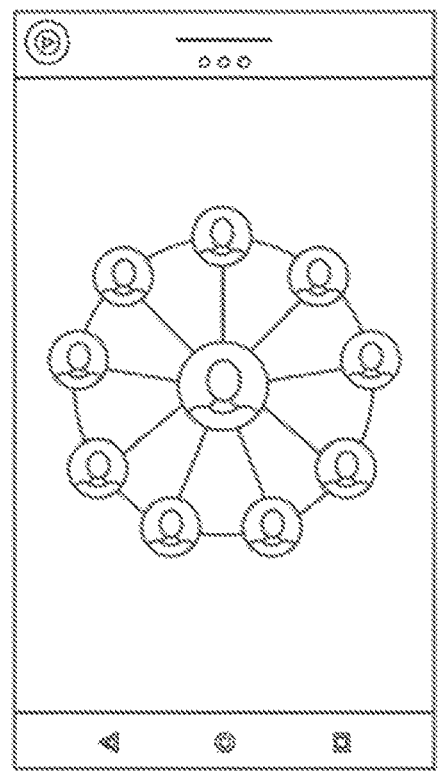
Figure 18I:
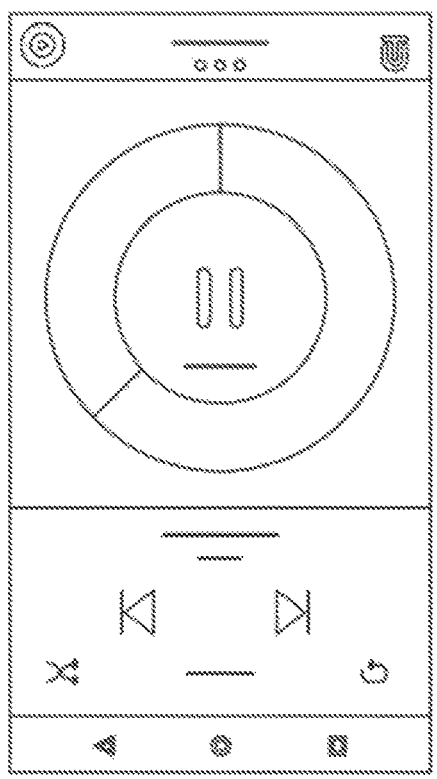
Figure 18J:
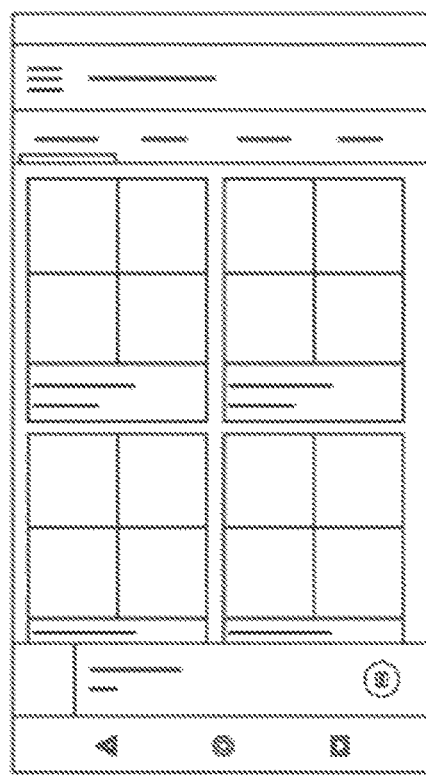
Figure 18K:
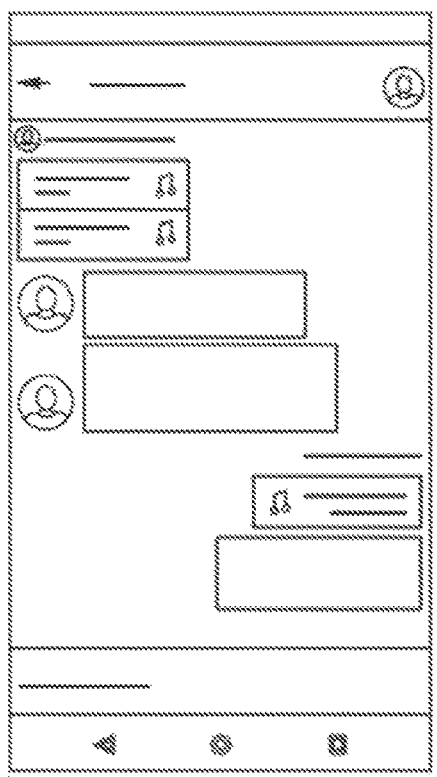
Figure 18L:
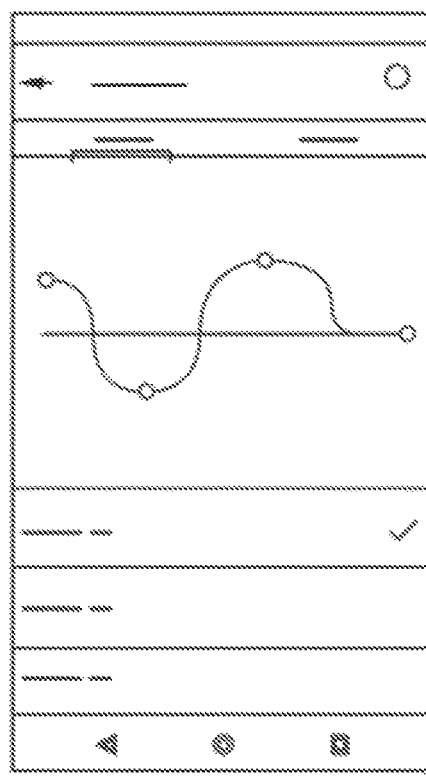
Figure 18M:
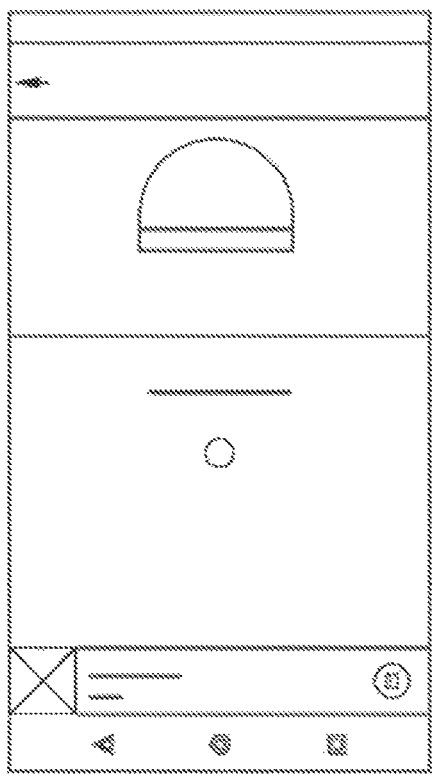
Figure 18N:
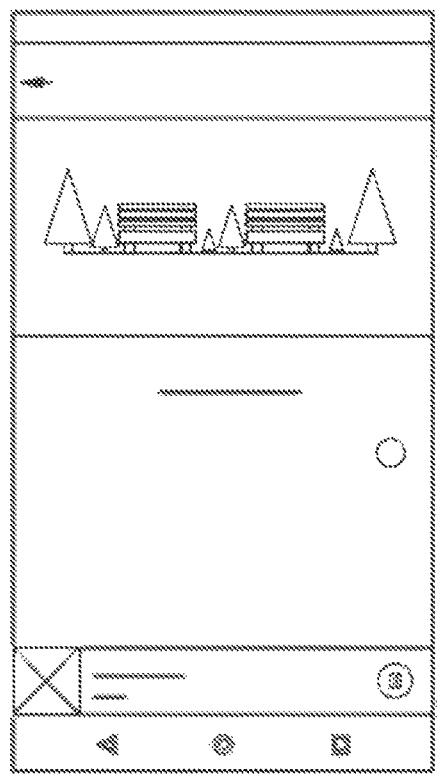
Figure 18O:
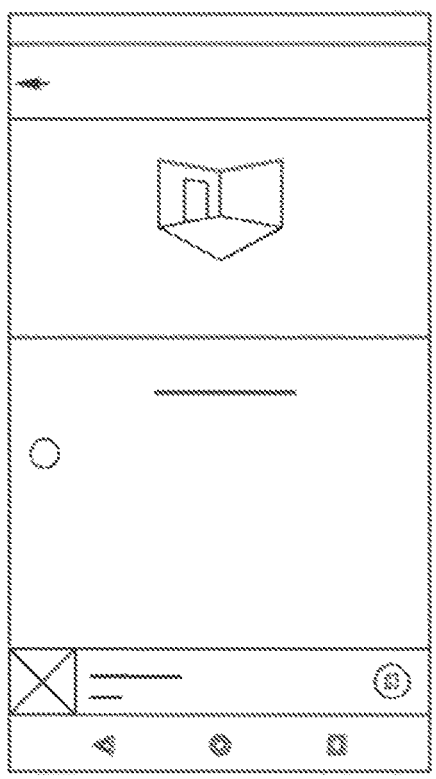
Figure 18P:
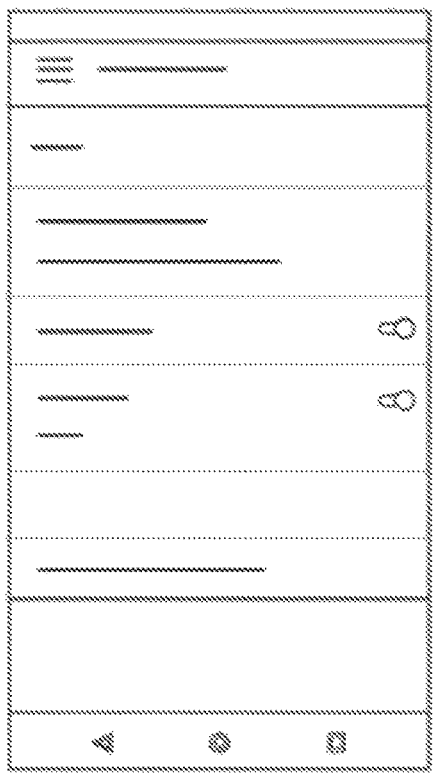
Figure 18Q:
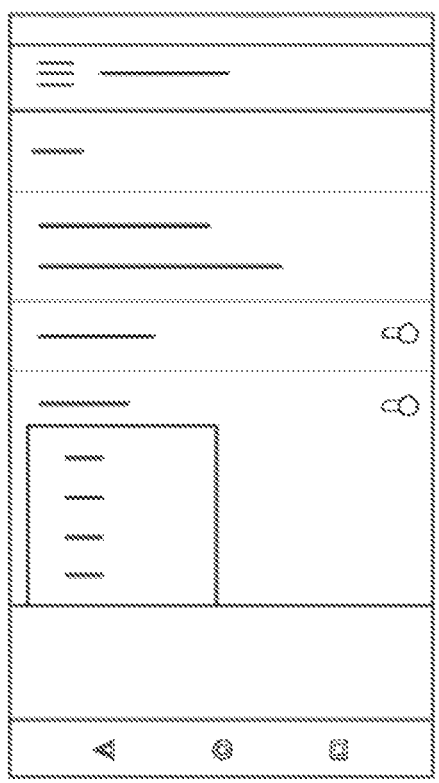
Figure 18R:
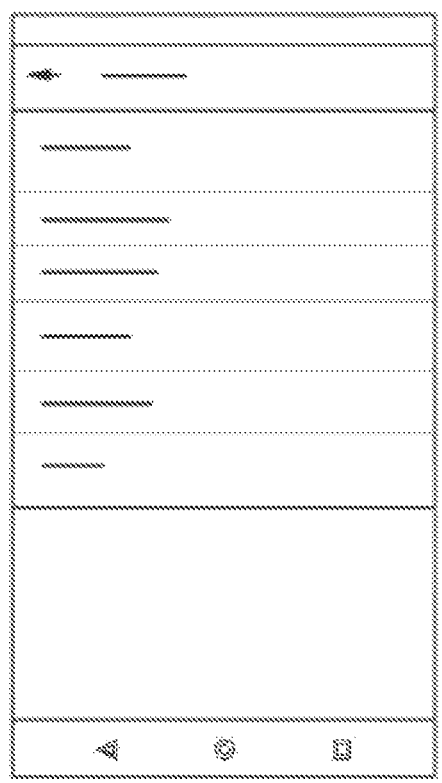

Example screen shots of 3D graphical interface are shown in FIGS. 18A-18R. FIG. 18A is a screen shot of 3D graphical interface 500 of a user tutorial. FIG. 18B is a screen shot of 3D graphical interface 500 for a sign in with Facebook. The users are able to sign in with their social media account or create a new account. FIG. 18C is a screen shot of 3D graphical interface 500 of a new registration. Users can create a new account.

FIG. 18D is a screen shot of 3D graphical interface 500 of a login to Spotify or other services.

A user can login to different streaming music services to import their libraries. FIG. 18E is a screen shot of 3D graphical interface 500 of a main menu.

From the main menu the user can select function or page. FIG. 18F is a screen shot of 3D graphical interface 500 of a Dashboard and control center. This is the default running screen where the user has control to the main features: SHH, Mesh, EQ, Audio effects, music library and ANC. FIG. 18G is a screen shot of 3D graphical interface 500 of using the SHH interface, the user can modify the direction and level of incoming sound by moving their finger in the 3D graphical interface 500.

FIG. 18H is a screen shot of 3D graphical interface 500 of HEDMesh 14.

User can enable/disable HEDMesh 14, see who is in HEDMesh 14 and who the master is.

FIG. 18I is a screen shot of 3D graphical interface 500 of a Music Player:

Users can control their music with the integrated player without having to come out of the app.

FIG. 18*j* is a screen shot of 3D graphical interface 500 of a Music library:

User can import their music libraries and playlists from other services within the app.

FIG. 18K is a screen shot of 3D graphical interface 500 of Mesh Messaging:

Users can chat to other members on the Mesh, rate songs, etc.

FIG. 18L is a screen shot of 3D graphical interface 500 of Equaliser:

User can change frequency and adjust the level for each frequency. Custom presets and be created and stored. There are also standard presets included.

FIG. 18M is a screen shot of 3D graphical interface 500 of Room effects:

A number of audio effects are available in the App.

FIG. 18N is a screen shot of 3D graphical interface 500 of an example of a room effect pre-set.

FIG. 18O is a screen shot of 3D graphical interface 500 of an example of a room effect pre-set.

FIG. 18P is a screen shot of 3D graphical interface 500 of settings. A user can change settings such as touch pad function swapping (left to right), enable/disable the presence sensors, power saving, send feedback and restore factory settings.

FIG. 18Q is a screen shot of 3D graphical interface 500 Power saving:

The Headphone detects when there is complete silence and the user can select the time after which, the Headphone will go to sleep mode.

FIG. 18R is a screen shot of 3D graphical interface 500 of About to provide product information such as model number, serial number, firmware, terms and conditions, etc.

HEDphone 12 can be formed of foam on the inner part that extends across the entire length of the from ear to ear, that gives the Headphone a comfortable snug fit.

Ear cup 704 is elongated, shaped like the human ear rather than the standard round shape. The shape, together with the more solid chassis, creates a closer fit to the head. For extra comfort, injection moulded memory foam is used for the full length inner cushion providing a good fit, making this design more comfortable than current headphones.

Foam piece 710 can be formed as a single continuous piece and is also customizable and can be replaced giving the user a wide choice of fabrics, colors and foam densities.

Figures 19A, 19B, 19C:
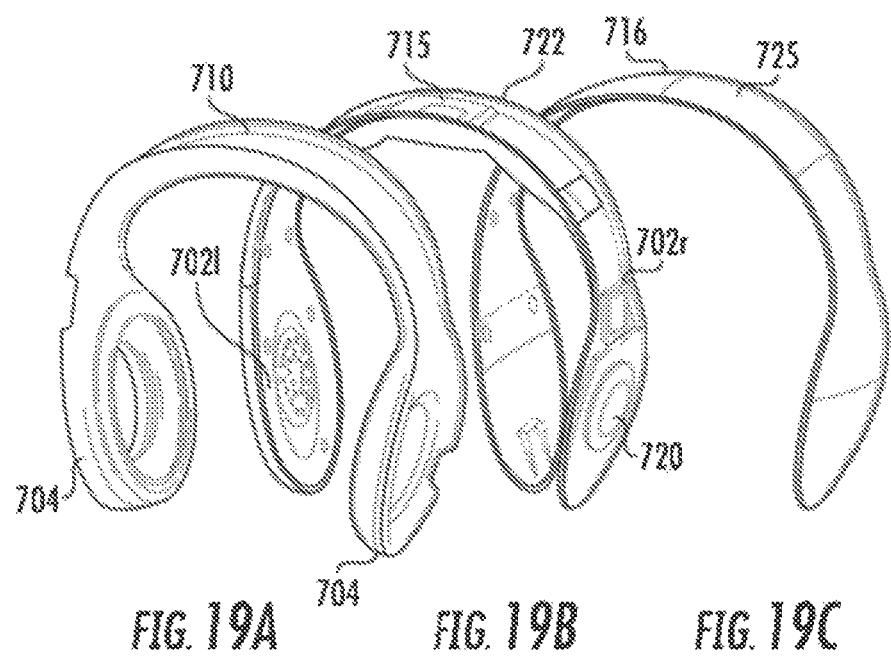
FIG. 19A is a schematic diagram of used with a foam piece used in a headband of the HEDphone.
FIG. 19B is a schematic diagram of a chassis used in the headband.
FIG. 19C is a schematic diagram of a foam carrier used in the headband.

In one embodiment shown in FIGS. 19A-19C, headband 710 includes foam piece 710 and is formed in one single chassis 715 from left ear cup 702*l* to right ear cup 702*r* with no mechanical hinges or sizing adjustments as shown in FIG. 19B. Chassis 715 houses all electronic components and is then covered by the outer casing 716 as shown in FIG. 19C. Outer casing 716 can be made in one piece. Chassis 715 is rigid in rigid areas 720, such as near drivers, PCBs and batteries, and allows more flexing in flexible areas 722 of headband 710 where needed.

Foam carrier 725 snaps onto chassis 715 as shown in FIG. 19C. Foam carrier 725 can be made of one moulded piece.

Figure 20A:
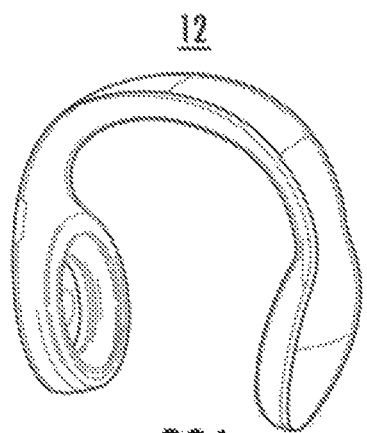
FIG. 20A is a schematic diagram of a large size headband used in the HEDphone.
Figure 20B:
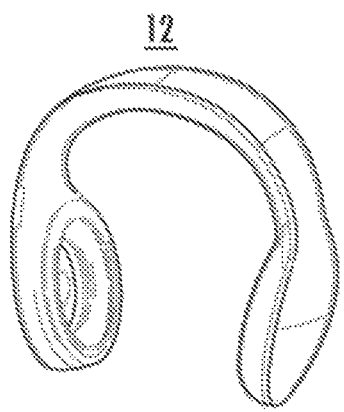
FIG. 20B is a schematic diagram of a medium size headband used in the HEDphone.
Figure 20C:
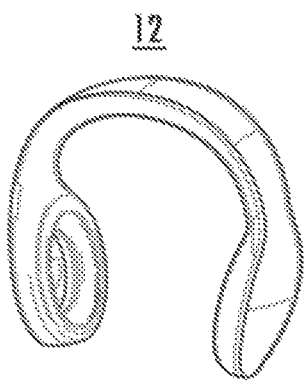
FIG. 20C is a schematic diagram of a small size headband used in the HEDphone.

HEDphone 402 can be formed by 3 completely detachable parts. The battery side, the electronics' side and the headband. The headband can be bought separately to the correct size. S, M, L, XL as shown in FIGS. 20A-20C. The HEDphone is fitted with 3 Lithium Ion batteries of 680 mAh each, totaling 2040 mAh, providing 15 hours of Bluetooth use with music and 8 hours of Mesh use. The batteries cannot be replaced by the user and can be fully recharged by using a micro USB cable in 3 hours. HEDphone 12 does not fold, making it stronger, more solid and less likely to break. It also allows for more room inside to fit electronic components and bigger batteries.

Figure 21:
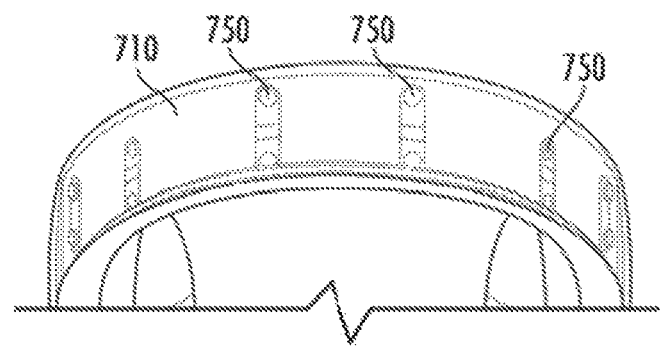
FIG. 21 is a schematic diagram of a HEDphone including housing of batteries in the headband.

FIG. 21 illustrates an embodiment of HEDphone 12 including rechargeable batteries housed in headband 710. A plurality of batteries 750 are housed in headband 710. In one embodiment, three rechargeable Lithium-Ion batteries are hosted in headband 710.

Figure 22A:
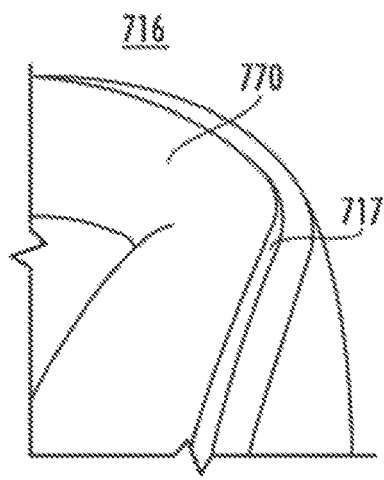
FIG. 22A is a schematic diagram of a portion of an outer casing including foam on an inner surface.
Figure 22B:
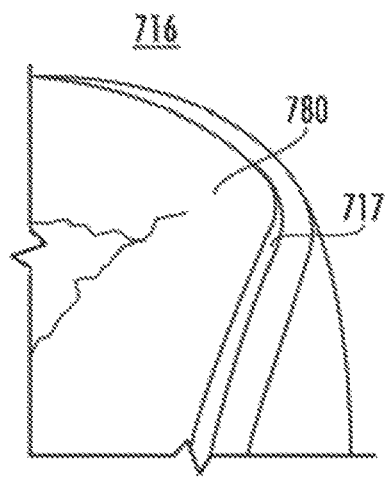
FIG. 22B is a schematic diagram of a portion of an outer casing including fur material on an inner surface.
Figure 22C:
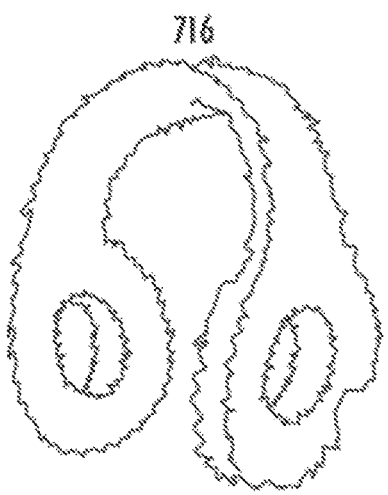
FIG. 22C is a schematic diagram of an outer casing including fur material on an inner surface.

In an embodiment of the present invention, outer casing 716 is formed of a single piece of injection-molded foam upholstered with fabric 760 as shown in FIG. 22A. Foam 770 can be provided on inner surface 717 of outer casing 716. Foam 770 provides additional cushioning during sport activities. Alternatively, fur material 780 can be provided on inner surface 717 of outer casing 716 as shown in FIGS. 22B-22C. A variety of densities, thicknesses, ear sizes, fabrics and colors, giving the user a large degree of personalization and customization for their ear size and personal style to outer casing 716.

Figure 23:
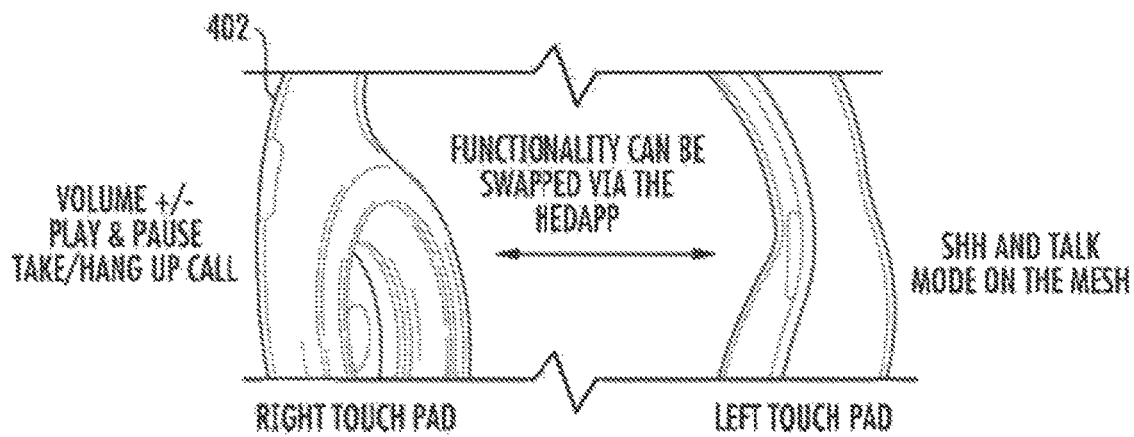
FIG. 23 is a schematic diagram of the HEDphone with functionality for a left hand user.

In one embodiment, functions of HEDphone 402 can be reversed by software and using HEDapp 19 for left handed users that prefer the most commonly used functions on the left side as shown in FIG. 23. The default function of the touch pads is to have the play/pause music and phone call actions on the right touch pad and the SHH and Talk mode on the left.

Figure 24:
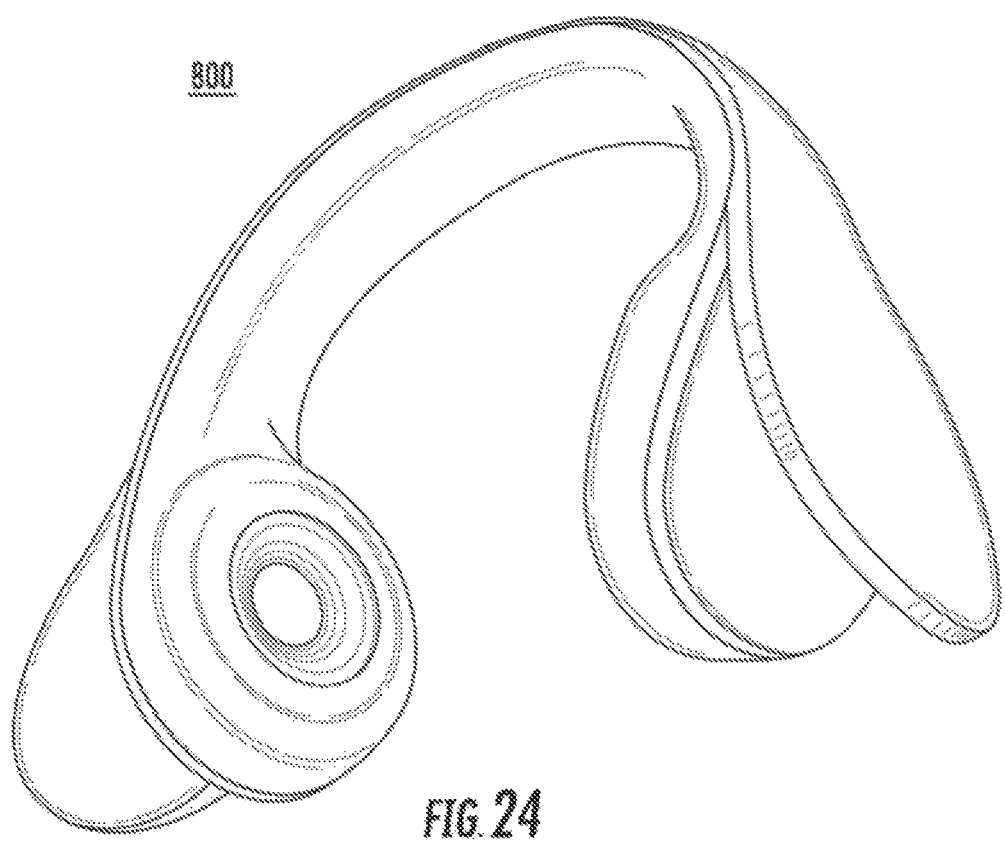
FIG. 24 is a schematic diagram of a cover for use with the HEDphone.

FIG. 24 is a schematic diagram of cover 800. Cover 800 can be attached to HEDphone 12 to provide the ability to attach custom accessory covers to protect the outer surface of the headphone while allowing the user yet another way to express their individuality.

The HEDapp is a user interface application downloadable to any mobile device which will allow the HEDphone 12a-12n user to control and monitor all its HEDphone's features. The HEDapp can be compatible with mobile operating systems such as for example IOS and Android. The HEDapp can have the functionality shown in Table 2.

Embodiments of the present invention may be implemented in connection with a special purpose or general purpose processor device that include both hardware and/or software components, or special purpose or general purpose computers that are adapted to have processing capabilities.

Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

The invention claimed is:

1. A first headphone system, comprising:
  a first set of two or more first microphones configured to receive in real time first external audio sound waves from sounds in an environment and to generate in real time first external audio data based on the first external audio sound waves;
  a second set of one or more second microphones configured to receive in real time second external audio sound waves from the sounds in the environment and to generate in real time first noise cancelling or attenuating audio data based on the second external audio sound waves, the second set of one or more second microphones being different than the first set of two or more first microphones, the first noise cancelling or attenuating audio data being different than the first external audio data;

a first processor configured to generate in real time desired audio data from the first external audio data based on user defined configuration data, the configuration data being based on configuration settings dynamically adjusted by the user in real time indicating desired sound from a desired direction and/or desired sound of a desired sound type; wherein the configuration settings comprise noise reduction, forward and rear microphone levels, music volume, and inbound audio level, and a set of one or more first speakers configured to output in real time combined sound waves, the combined sound waves including desired audio sound waves based on the desired audio data and including first noise cancelling or attenuating audio sound waves based on the first noise cancelling or attenuating audio data, the first noise cancelling or attenuating audio sound waves configured to assist in cancelling or attenuating the external audio sound waves.

2. The first headphone system of claim 1, wherein the first set of two or more first microphones includes a front microphone, a rear microphone, a left microphone and a right microphone.

3. The first headphone system of claim 1, wherein the first set of two or more first microphones includes omnidirectional microphones.

4. The first headphone system of claim 1, wherein the first set of two or more first microphones includes directional microphones.

5. The first headphone system of claim 1, wherein the first processor generates the desired audio data from the first external audio data based on the desired direction, the desired direction being set by the configuration data.

6. The first headphone system of claim 1, wherein the first processor generates the desired audio data from the first external audio data based on one or more desired sound types that the user wishes to enhance, the configuration data indicating desired frequencies associated with the one or more desired sound types.

7. The first headphone system of claim 1, wherein the first processor generates the desired audio data from the first external audio data based on a range of frequencies associated with a human voice.

8. The first headphone system of claim 1, further comprising at least one third microphone configured to receive first voice data from a headphone user.

9. The first headphone system of claim 8, wherein the first voice data from the headphone user is transmitted to a second headphone system.

10. The first headphone system of claim 1, wherein the first headphone system is configured to receive the configuration data from an application.

11. The first headphone system of claim 10, wherein the application is configured to provide a graphical user interface for receiving the configuration settings.

12. The first headphone system of claim 11, wherein the application is configured to provide a representation identifying direction information and/or sound type information.

13. A method, comprising:
using a first set of two or more first microphones to receive in real time first external audio sound waves from sounds in an environment and to generate in real time first external audio data based on the external audio sound waves;
using a second set of one or more second microphones to receive in real time second external audio sound waves from the sounds in the environment and to generate in real time first noise cancelling or attenuating audio data based on the second external audio sound waves, the second set of one or more second microphones being different than the first set of two or more first microphones, the first noise cancelling or attenuating audio data being different than the first external audio data;
generating in real time desired audio data from the first external audio data based on user defined configuration data, the configuration data being based on configuration settings dynamically adjusted by the user in real time indicating desired sound from a desired direction and/or desired sound of a desired sound type; wherein the configuration settings comprise noise reduction, forward and rear microphone levels, music volume, and inbound audio level, and using a set of one or more first speakers to output in real time combined sound waves, the combined sound waves including desired audio sound waves based on the desired audio data and including first noise cancelling or attenuating audio sound waves based on the first noise cancelling or attenuating audio data, the first noise cancelling or attenuating audio sound waves configured to assist in cancelling or attenuating the external audio sound waves.

14. The method of claim 13, wherein the first set of two or more first microphones includes a front microphone, a rear microphone, a left microphone and a right microphone.

15. The method of claim 13, wherein the desired audio data is generated from the first external audio data based on the desired direction, the desired direction being set by the configuration data.

16. The method of claim 13, wherein the desired audio data is generated from the first external audio data based on one or more desired sound types that the user wishes to enhance, the configuration data indicating desired frequencies associated with the one or more desired sound types.

17. The method of claim 13, wherein the desired audio data is generated from the first external audio data based on a range of frequencies associated with a human voice.

18. The method of claim 13, further comprising receiving the configuration data from an application.

19. The method of claim 18, wherein the application provides a graphical user interface for receiving the configuration settings.

20. The method of claim 19, wherein the graphical user interface provides a representation identifying direction information and/or sound type information.

* * * * *